US012544425B2

(12) United States Patent
Demoulin et al.

(10) Patent No.: US 12,544,425 B2
(45) Date of Patent: Feb. 10, 2026

(54) METHODS FOR PREVENTING AND TREATING BRAIN INFLAMMATION

(71) Applicant: BIOXODES, Charleroi (BE)

(72) Inventors: Stéphanie Demoulin, Antheit (BE); Valérie Pireaux, Namur (BE); Edmond Godfroid, Vilvoorde (BE)

(73) Assignee: BIOXODES, Charleroi (BE)

( * ) Notice: Subject to any disclaimer, the term of this patent is extended or adjusted under 35 U.S.C. 154(b) by 0 days.

(21) Appl. No.: 18/953,476

(22) Filed: Nov. 20, 2024

(65) Prior Publication Data

US 2025/0082725 A1    Mar. 13, 2025

Related U.S. Application Data

(63) Continuation of application No. PCT/EP2023/063467, filed on May 19, 2023.

(30) Foreign Application Priority Data

May 20, 2022  (BE) .................................. 2022/5387
Aug. 18, 2022  (BE) .................................. 2022/5647

(51) Int. Cl.
    *A61K 38/17*    (2006.01)
    *A61P 25/00*    (2006.01)
    *A61P 29/00*    (2006.01)

(52) U.S. Cl.
    CPC .......... *A61K 38/1767* (2013.01); *A61P 25/00* (2018.01); *A61P 29/00* (2018.01)

(58) Field of Classification Search
    CPC ........ A61K 38/1767; A61P 25/00; A61P 9/10; A61P 29/00; C07K 14/43527
    See application file for complete search history.

(56) References Cited

U.S. PATENT DOCUMENTS

| | | | |
|---|---|---|---|
| 5,811,514 A | 9/1998 | Bard et al. | |
| 8,277,813 B2* | 10/2012 | Godfroid | A61K 38/57 424/185.1 |
| 9,169,314 B2* | 10/2015 | Godfroid | C07K 14/8114 |
| 9,212,216 B2* | 12/2015 | Godfroid | C07K 14/43527 |
| 11,897,924 B2* | 2/2024 | Demoulin | C07K 14/8114 |
| 2016/0046728 A1 | 2/2016 | Godfroid et al. | |

FOREIGN PATENT DOCUMENTS

| | | |
|---|---|---|
| EP | 2123670 A1 | 11/2009 |
| WO | WO 00/77198 A2 | 12/2000 |
| WO | 2019149906 A1 | 8/2019 |
| WO | 2019185828 A1 | 10/2019 |

OTHER PUBLICATIONS

Search Report issued on Oct. 23, 2023, in corresponding International Application No. PCT/EP2023/063467, 8 pages.
Goldstein et al., Risk of Thromboembolism Following Acute Intracerebral Hemorrhage, National Institute of Health, Neurocritical Care, XP093069300, ISSN: 1541-6933, 2009, vol. 10, No. 1, 16 pages.
Luna et al., "Anticoagulation Monitoring of Pediatric Patients on Life Support Systems Using a Microfluid Device that Mimics Complex Vascular Architecture", Research & Practice in Thrombosis & Haemostasis, PB502, 2 pages.
Decrem et al., Ir-CPI, a Coagulation Contact Phase Inhibitor from the Tick Ixodes Ricinus, Inhibits Thrombus Formation Without Impairing Hemostasis, The Journal of Experimental Medicine, The Rockefeller University Press, 2009, vol. 206, No. 11, 15 pages.
Demoulin et al., "Dual Inhibition of Factor XIIa and XIa as a Therapeutic Approach for Safe Thromboprotection", Journal on Thrombosis and Haemostasis, International Society on Thrombosis and Haemostasis, 2021, vol. 19, 7 pages.
Pireaux et al., "Anticoagulation With an Inhibitor of Factors XIa and XIIa during Cardiopulmonary Bypass", Journal of the American College of Cardiology, The Authors, Elsevier, ISSN: 0735-1097, 2019, vol. 74, No. 17, 12 pages.

* cited by examiner

*Primary Examiner* — Olga N Chernyshev
(74) *Attorney, Agent, or Firm* — Birch, Stewart, Kolasch & Birch, LLP

(57) ABSTRACT

Methods for treating brain inflammation, including brain inflammation occurring or susceptible to occur after brain hemorrhage, which include the administration of a protein or polypeptide including a polypeptide having at least 75% sequence identity with the amino acid sequence SEQ ID NO: 1, or a pharmaceutical composition including the protein or polypeptide. Also, a method for preventing, reducing, decreasing, and/or inhibiting neuronal death, which includes the administration of a protein or polypeptide including a polypeptide having at least 75% sequence identity with the amino acid sequence SEQ ID NO: 1, or a pharmaceutical composition including the protein or polypeptide.

16 Claims, 4 Drawing Sheets

Specification includes a Sequence Listing.

```
                           SEQUENCE LISTING

Sequence total quantity: 3
SEQ ID NO: 1            moltype = AA  length = 67
FEATURE                 Location/Qualifiers
source                  1..67
                        mol_type = protein
                        organism = Ixodes ricinus
SEQUENCE: 1
ANHKGRGRPA KCKLPPDDGP CRARIPSYYF DRKTKTCKEF MYGGCEGNEN NFENITTCQE  60
ECRAKKV                                                           67

SEQ ID NO: 2            moltype = AA  length = 67
FEATURE                 Location/Qualifiers
source                  1..67
                        mol_type = protein
                        organism = synthetic construct
SEQUENCE: 2
ANHKGRGRPA KCKLPPDDGP CRARIPSYYF DRKTKTCKEF MYGGCEGNEN NFEQITTCQE  60
ECRAKKV                                                           67

SEQ ID NO: 3            moltype = DNA  length = 204
FEATURE                 Location/Qualifiers
source                  1..204
                        mol_type = genomic DNA
                        organism = Ixodes ricinus
SEQUENCE: 3
gccaaccaca aaggtagagg gcggcctgcg aagtgtaaac ttcctccgga cgacggacca  60
tgcagagcac gaattccgag ttactacttt gatagaaaaa ccaaaacgtg caaggagttt 120
atgtatggcg gatgcgaagg aaacgaaaac aattttgaaa acataactac gtgccaagag 180
gaatgcagag caaaaaaagt ctaa                                       204
```

METHODS FOR PREVENTING AND TREATING BRAIN INFLAMMATION

CROSS REFERENCE TO RELATED APPLICATIONS

This application is a Continuation of International Application PCT/EP2023/063467, filed May 19, 2023, which claims the benefit of priority from Belgian Application No. 2022/5387, filed May 20, 2022, and Belgian Application No. 2022/5647, filed Aug. 18, 2022, the contents of which are incorporated herein by reference in their entirety.

REFERENCE TO A SEQUENCE LISTING

In accordance with 37 CFR § 1.831, the present specification makes reference to a Sequence Listing submitted electronically as a .xml file named "2411 PCT Sequence listing.xml". The .xml file was generated on May 17, 2023, and is 3,910 bytes in size. The entire contents of the Sequence Listing are hereby incorporated by reference.

FIELD

The present invention relates to proteins and polypeptides comprising an Ixodes ricinus salivary gland polypeptide, and their use for preventing and/or treating brain inflammation.

BACKGROUND

Neuroinflammation is defined as an inflammatory response within the brain (i.e., brain inflammation) or spinal cord. This inflammation is mediated by the production of cytokines, chemokines, reactive oxygen species, and secondary messengers. These mediators are produced by resident glia (microglia and astrocytes), endothelial cells, and peripherally derived immune cells.

Neuroinflammation or brain inflammation may occur after brain injury, for example in case of hemorrhagic stroke. Hemorrhagic stroke is due to bleeding into the brain by the rupture of a blood vessel. Hemorrhagic stroke may be further subdivided into intracerebral hemorrhage (ICH) and subarachnoid hemorrhage (SAH). ICH is bleeding into the brain parenchyma, and SAH is bleeding into the subarachnoid space. Although comprising a minority of stroke cases (10-15%), ICH and SAH patients are often severely impaired and these disorders contribute an equivalent burden of morbidity and mortality as ischemic stroke. Clinical outcomes of the condition are poor: only 20% of patients achieve functional independence at 6 months after ICH. The most common cause of ICH is chronic hypertension, however cerebral amyloid angiopathy, anticoagulant medications, and underlying vascular anomalies account for a significant proportion of cases.

ICH not only causes primary brain injury through direct mechanical effects of the hemorrhage, but also leads to secondary brain injury (SBI), which is a major contributor to poor outcomes after ICH. SBI includes the disruption of the blood-brain-barrier (BBB), resulting in perihematomal edema (PHE) and death of brain parenchymal cells. The SBI involves, inter alia, neuroinflammation.

Neuroinflammation associated to ICH involves the early activation of resident microglia, release of proinflammatory mediators and the infiltration of systemic inflammatory cells.

The first activated innate immune cells after ICH and other acute brain injuries are microglia (i.e., the resident macrophages of the central nervous system). They continuously scan the extracellular brain environment and can be activated within minutes after tissue damage. The number of activated microglia/macrophages peaks at 72 h and returns to normal level 3-4 weeks after ICH. Monocyte-derived macrophages infiltrate into the perihematomal and hematoma region after microglia are activated. Upon various stimuli, microglia and brain macrophages produce proinflammatory cytokines including TNF-α and IL-1β, chemokines and reactive oxygen species. Beyond the neurotoxic cytokines, chemokines such as CXCL2 produced by microglia have chemotactic activity on neutrophils and thus exacerbate the inflammatory reaction. Thus, microglia also enforce early neuroinflammation by recruiting and activating blood-derived leukocytes which may worsen ICH-induced neuronal damage.

Neutrophils are the earliest leukocyte subtype to infiltrate the hematoma site, within 4 to 5 hours in animal models and peak at 3 days. In humans, neutrophils infiltrate the hematoma and the surrounding brain tissue within the first days (≤72 hours) after ICH. Neutrophils and neutrophil extracellular traps (NETs)—extracellular weblike structures composed of nuclear DNA/histone and granular content released by neutrophils—may damage the brain by, e.g., producing reactive oxygen species, releasing proinflammatory proteases and aggravating neuronal death. NETs were also reported to promote, e.g., neuroinflammation and neuronal damage after SAH while pharmacological inhibition of NETs reduced the inflammatory damage in mice.

Myeloperoxidase (MPO) is an important inflammatory factor in the myeloid system. MPO is abundantly expressed in neutrophils and other myeloid cells, such as Ly-6C$^{high}$ monocytes, macrophages, and microglia. Myeloperoxidase and its active products participate in the occurrence and development of intracerebral hemorrhage, including damage to the blood-brain barrier and brain. As a specific inflammatory marker, myeloperoxidase can be used in the evaluation of vascular disease occurrence and development, and experimental data has indicated that the inhibition or lack of myeloperoxidase has positive impacts on prognosis.

There has been limited improvement in case fatality from ICH in the last few decades and most survivors are left with severe disability. Treatment options for ICH are very limited and there is not yet a definitive therapy beyond supportive care. Thus, there is an unmet medical need for agents that allow prevention or safe and fast treatment of brain inflammation.

The inventors have previously demonstrated the role of a Ixodes ricinus salivary gland polypeptide on neutrophils as part of a thrombus treatment (WO2019/149906). Here, the inventors surprisingly demonstrate that this polypeptide has anti-inflammatory effects on the brain in a model of intracerebral hemorrhage and without any thrombus. Advantageously, these anti-inflammatory effects in the brain are accompanied by no increase of the volume of hemorrhage or oedema. Consequently, this polypeptide enables the prevention or the early treatment of brain inflammation, without increasing the risk of aggravating the hemorrhage, which is useful for improving the clinical outcome of the patients.

SUMMARY

This invention thus relates to a protein or polypeptide comprising a polypeptide having at least 75% sequence identity with the amino acid sequence SEQ ID NO: 1 for use for preventing and/or treating brain inflammation in a subject in need thereof.

In some embodiments, the protein or polypeptide comprises a polypeptide having the amino acid sequence SEQ ID NO: 1 or SEQ ID NO: 2.

In some embodiments, the brain inflammation is an acquired brain inflammation or a spontaneous brain inflammation. In some embodiments, the brain inflammation is an induced brain inflammation. In some embodiments, the brain inflammation is occurring or susceptible to occur after brain hemorrhage. In some embodiments, the brain inflammation is following brain hemorrhage.

In some embodiments, the brain inflammation is induced by an acquired brain injury. In some embodiments, the brain inflammation is induced by a traumatic brain injury. In some embodiments, the brain inflammation is induced by a non-traumatic brain injury.

In some embodiments, the brain inflammation is induced by a brain hemorrhage, an ischemic stroke, a seizure, an infection, a brain tumor, a hypoxic/anoxic brain injury, an autoimmune disease, a toxicity or a hydrocephalus.

In some embodiments, the brain inflammation is an acquired brain inflammation. In some embodiments, the acquired brain inflammation is induced by a traumatic brain injury or an infection. In some embodiments, the acquired brain inflammation is induced by a traumatic brain injury.

In some embodiments, the brain inflammation is a spontaneous brain inflammation. In some embodiments, the spontaneous brain inflammation is induced by a non-traumatic brain injury or an autoimmune disease.

In some embodiments, the protein or polypeptide is administered at a dose of about 200 mg to about 20,000 mg per adult per day.

In some embodiments, the protein or polypeptide is administered within about 120 hours after the onset of brain hemorrhage and/or after a brain injury, preferably within 96 hours, more preferably within 72 hours. In some embodiments, the protein or polypeptide is administered within 48 hours, within 24 hours, within 12 hours, within 10 hours, within 8 hours or within 6 hours after the onset of brain hemorrhage and/or after a brain injury. In some embodiments, the protein or polypeptide is administered within about 6 hours to about 8 hours after the onset of brain hemorrhage and/or after a brain injury.

This invention also relates to a protein or polypeptide comprising a polypeptide having at least 75% sequence identity with the amino acid sequence SEQ ID NO: 1 for use for preventing and/or treating brain inflammation in a subject in need thereof, wherein the protein or polypeptide is administered within about 120 hours after the onset of brain hemorrhage inflammation, preferably within 96 hours, more preferably within 72 hours. In some embodiments, the protein or polypeptide is administered within 48 hours, within 24 hours, within 12 hours, within 10 hours, within 8 hours or within 6 hours after the onset of brain inflammation. In some embodiments, the protein or polypeptide is administered within about 6 hours to about 8 hours after the onset of brain inflammation.

In some embodiments, the protein or polypeptide is administered continuously, preferably by perfusion. In some embodiments, the protein or polypeptide is administrated to the subject rapidly after being exposed to a risk to develop brain inflammation. In some embodiments, the protein or polypeptide is administered continuously for about 48 hours to about 72 hours.

The present invention also relates to a pharmaceutical composition comprising a protein or polypeptide as described herein, and at least one pharmaceutically acceptable excipient. In some embodiments, the pharmaceutical composition further comprises another therapeutic agent.

The present invention further concerns a kit comprising a protein or polypeptide or a pharmaceutical composition as described herein.

Another object of the present invention is a method for preventing and/or treating brain inflammation in a subject in need thereof, comprising administering to said subject a therapeutically effective amount of a protein or polypeptide comprising a polypeptide that has at least 75% sequence identity with the amino acid sequence SEQ ID NO: 1 or SEQ ID NO: 2, or a pharmaceutical composition comprising said protein or polypeptide. In some embodiments, the brain inflammation occurs or is susceptible to occur after brain hemorrhage. In some embodiments, the therapeutically effective amount is a dose of about 200 mg to about 20,000 mg per adult per day. In some embodiments, the protein or polypeptide is administered to said subject within about 120 hours after the onset of brain inflammation and/or after a brain hemorrhage, preferably within 96 hours, more preferably within 72 hours. In some embodiments, the protein or polypeptide is administered to said subject within about 24 hours after the onset of brain inflammation and/or after a brain hemorrhage, preferably within 15 hours, more preferably within 12 hours.

Another object of the present invention is a method for preventing, reducing, decreasing and/or inhibiting neuronal death in a subject in need thereof, comprising administering to said subject a therapeutically effective amount of a protein or polypeptide comprising a polypeptide that has at least 75% sequence identity with the amino acid sequence SEQ ID NO: 1 or SEQ ID NO: 2, or a pharmaceutical composition comprising said protein or polypeptide. In some embodiments, the neuronal death occurs after brain hemorrhage. In some embodiments, the protein or polypeptide is administered to said subject within 120 hours after the onset of neuronal death and/or brain hemorrhage, preferably within 72 hours, more preferably within 24 hours, even more preferably within 12 hours.

DETAILED DESCRIPTION

Figure 1A:
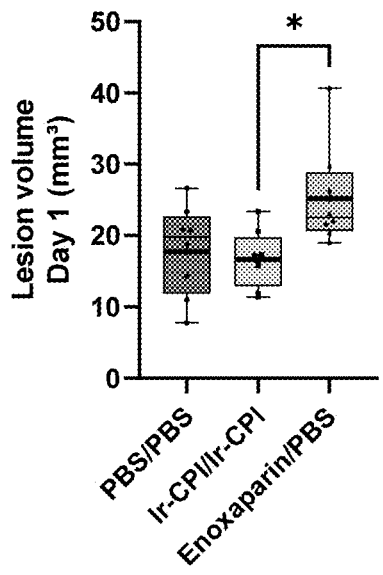
FIGS. 1A-1D are a set of box plots showing lesion and hemorrhage volumes measured on Day 1 and Day 3 after intracerebral hemorrhage induction by injection of collagenase in the right striatum of mice. Mice were treated with either Ir-CPI (injection+perfusion), enoxaparin (injection enoxaparin+perfusion with NaCl) or PBS alone (injection+perfusion). 1A and 1B show lesion volumes at Day 1 and Day 3, respectively. 1C and 1D show hemorrhage volumes at Day 1 and Day 3, respectively. Boxes show median and quartiles. Whiskers show min and max. Individual values are plotted. Bold lines indicate the means. N=8 mice per group on Day 1. For Day 3, n=7 for PBS group and n=6 for Ir-CPI and enoxaparin groups. *$p<0.05$ (Kruskal-Wallis test with Dunn's multiple comparisons test).
Figure 1B:
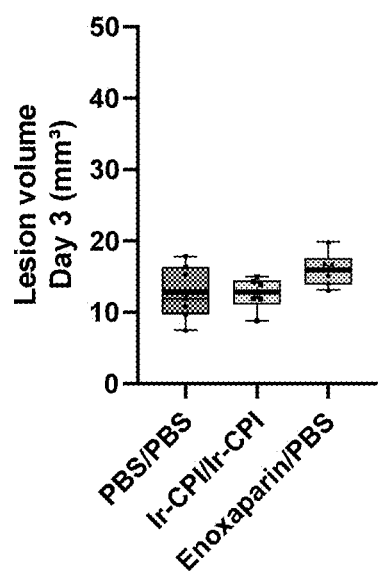
Figure 1C:
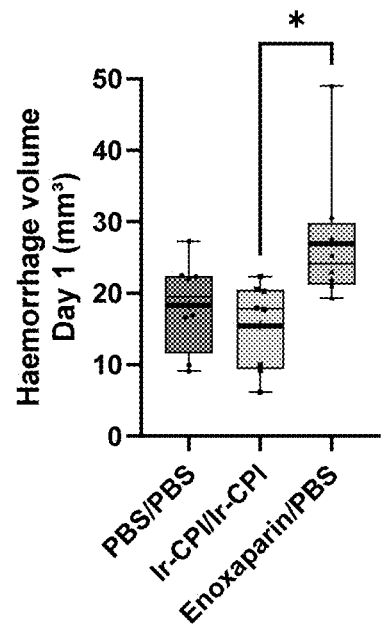
Figure 1D:
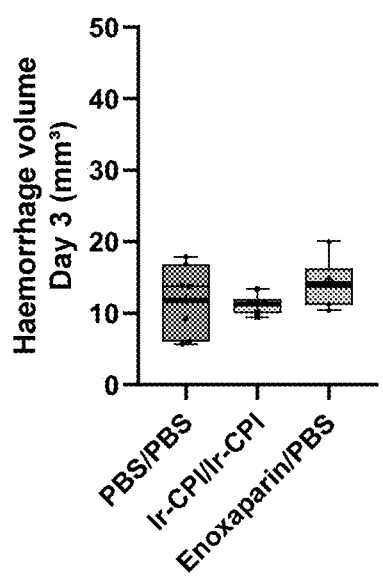

In the present invention, the following terms have the following meanings:

"About" preceding a value means plus or minus 10% of said value.

"Identity" refers to a measure of the identity of nucleotide sequences or amino acid sequences. In general, the sequences are aligned so that the highest order match is obtained. "Identity" per se has an art-recognized meaning and can be calculated using published techniques. While there exist a number of methods to measure identity between two nucleic acid or polypeptide sequences, the term "identity" is well known to skilled artisans. Methods to determine identity and similarity are codified in computer programs. Preferred computer program methods to determine identity and similarity between two sequences include, but are not limited to, GCG program package.

As an illustration, by a nucleic acid having a nucleotide sequence having at least, for example, 95% "identity" to a reference nucleotide sequence is intended that the nucleotide sequence of the nucleic acid is identical to the reference sequence except that the nucleic acid sequence may include an average up to five point-mutations per each 100 nucleotides of the reference nucleotide sequence. In other words, to obtain a nucleic acid having a nucleotide sequence at least 95% identical to a reference nucleotide sequence, up to 5% of the nucleotides in the reference sequence may be deleted or substituted with another nucleotide, or a number of nucleotides up to 5% of the total nucleotides in the reference sequence may be inserted into the reference sequence. These mutations of the reference sequence may occur at the 5' or 3' terminal positions of the reference nucleotide sequence or anywhere between those terminal positions, interspersed either individually among nucleotides in the reference sequence or in one or more contiguous groups within the reference sequence.

"Pharmaceutically acceptable excipient" refers to an excipient that does not produce an adverse, allergic or other untoward reaction when administered to an animal, preferably a human. It includes any and all solvents, dispersion media, coatings, antibacterial and antifungal agents, isotonic and absorption delaying agents and the like. A pharmaceutically acceptable carrier or excipient refers to a non-toxic solid, semi-solid or liquid filler, diluent, encapsulating material or formulation auxiliary of any type. For human administration, preparations should meet sterility, pyrogenicity, general safety and purity standards as required by FDA or EMA Office of Biologics standards.

"Polypeptide" refers to any peptide or protein comprising two or more amino acids joined to each other by peptide bonds or modified peptide bonds, i.e., peptide isosteres. "Polypeptide" refers to both short chains, commonly referred to as peptides, oligopeptides or oligomers, and to longer chains, generally referred to as proteins. Polypeptides may contain amino acids other than the 20 gene-encoded amino acids.

"Protein" refers to a sequence of more than 100 amino acids and/or to a multimeric entity. The proteins of the invention are not limited to a specific length of the product. The term "polypeptide" or "protein" does not refer to or exclude post-expression modifications of the protein, for example, glycosylation, acetylation, phosphorylation and the like, as well as other modifications known in the art, both naturally occurring and non-naturally occurring. Such modifications are well described in basic texts and in more detailed monographs, as well as in a voluminous research literature. Modifications can occur anywhere in a polypeptide or protein, including the peptide backbone, the amino acid side-chains and the amino or carboxyl termini. It will be appreciated that the same type of modification may be present in the same or varying degrees at several sites in a given polypeptide or protein. Also, a given polypeptide or protein may contain many types of modifications. Polypeptides or proteins may be branched as a result of ubiquitination, and they may be cyclic, with or without branching. Cyclic, branched and branched cyclic polypeptides or proteins may result from posttranslational natural processes or may be made by synthetic methods. Modifications include acetylation, acylation, ADP-ribosylation, amidation, covalent attachment of flavin, covalent attachment of a hem moiety, covalent attachment of a nucleotide or nucleotide derivative, covalent attachment of a lipid or lipid derivative, covalent attachment of phosphotidylinositol, cross-linking, cyclization, disulfide bond formation, demethylation, formation of covalent cross-linkings, formation of cystine, formation of pyroglutamate, formylation, gamma-carboxylation, glycosylation, GPI anchor formation, hydroxylation, iodination, methylation, myristoylation, oxidation, proteolytic processing, phosphorylation, prenylation, racemization, selenoylation, sulfation, transfer-RNA mediated addition of amino of amino acids to proteins such as arginylation, and ubiquitination. A protein may be an entire protein, or a subsequence thereof.

"Subject" refers to a mammal, preferably a human. In one embodiment, the subject is a man. In another embodiment, the subject is a woman. In one embodiment, a subject may be a "patient", i.e., a warm-blooded animal, more preferably a human, who/which is awaiting the receipt of, or is receiving medical care or was/is/will be the object of a medical procedure, or is monitored for the development of a disease or condition, preferably brain inflammation or a disease associated with or induced by brain inflammation. In one embodiment, the subject is an adult (for example a subject above the age of 18). In another embodiment, the subject is a child (for example a subject below the age of 18).

"Therapeutically effective amount" means the level or amount of agent that is aimed at, without causing significant negative or adverse side effects to the target, (1) delaying or preventing a disease or condition, preferably brain inflammation or a disease associated with or induced by brain inflammation; (2) slowing down or stopping the progression, aggravation, or deterioration of one or more symptoms of disease or condition, preferably brain inflammation or a disease associated with or induced by brain inflammation; (3) bringing about ameliorations of the symptoms of brain inflammation or a disease or condition associated with brain inflammation; (4) reducing the severity or incidence of disease or condition associated with brain inflammation or a disease associated with or induced by brain inflammation; or (5) preventing disease or condition associated with brain inflammation or a disease associated with or induced by brain inflammation. In one embodiment, a therapeutically effective amount is administered prior to the onset of brain inflammation or a disease associated with or induced by brain inflammation, for a prophylactic or preventive action.

The term "treating" or "treatment" or "alleviation" refers to both therapeutic treatment and prophylactic or preventative measures; wherein the object is to prevent or slow down (lessen) brain inflammation or a disease associated with or induced by brain inflammation. Those in need of treatment include those already affected with a brain inflammation or a disease associated with or induced by brain inflammation as well as those prone to have a brain inflammation or a disease associated with or induced by brain inflammation or those in whom a brain inflammation or a disease associated with or induced by brain inflammation is to be prevented. A subject or mammal is successfully "treated" for a brain inflammation or a disease associated with or induced by brain inflammation if, after receiving a therapeutic amount of a protein or polypeptide according to the methods of the present invention, the patient shows observable and/or measurable reduction in or absence of one or more of the following: reduction in the number of pathogenic cells; reduction in the percent of total cells that are pathogenic; and/or relief to some extent, one or more of the symptoms associated with a brain inflammation or a disease associated with or induced by brain inflammation; reduced morbidity and mortality, and improvement in quality of life issues. The above parameters for assessing successful treatment and improvement in a brain inflammation or a disease associated with or induced by brain inflammation are readily measurable by routine procedures familiar to a physician.

The present invention relates to a protein or polypeptide comprising a polypeptide having at least 75% sequence identity with the amino acid sequence SEQ ID NO: 1 for use for preventing and/or treating brain inflammation in a subject in need thereof. In a specific embodiment, the protein or polypeptide of the invention is for use for preventing brain inflammation in a subject in need thereof.

In some embodiments, the protein or polypeptide for use according to the invention comprises or consists of an Ixodes ricinus salivary gland polypeptide or a fragment or a variant thereof, hereby referred to as Ir-CPI.

In some embodiments, the protein or polypeptide for use according to the invention has at least 75% sequence identity with the amino acid sequence SEQ ID NO: 1 or SEQ ID NO: 2.

In some embodiments, the protein or polypeptide for use according to the invention has at least 75% sequence identity with the amino acid sequence SEQ ID NO: 1. In some embodiments, the protein or polypeptide for use according to the invention has at least 75% sequence identity with the amino acid sequence SEQ ID NO: 2.

As used herein, "at least 75% sequence identity" means at least 75%, 80%, 85%, 90%, 95%, 96%, 97%, 98%, 99%, 99.5%, 99.9% or 100% identical.

In some embodiments, the protein or polypeptide for use according to the invention comprises a polypeptide having the amino acid sequence SEQ ID NO: 1 or SEQ ID NO: 2.

In some embodiments, the protein or polypeptide for use according to the invention comprises a polypeptide having the amino acid sequence SEQ ID NO: 1. In some embodiments, the protein or polypeptide for use according to the invention comprises a polypeptide having the amino acid sequence SEQ ID NO: 2.

In some embodiments, the protein or polypeptide for use according to the invention has the amino acid sequence SEQ ID NO: 1 or SEQ ID NO: 2.

In some embodiments, the protein or polypeptide for use according to the invention has the amino acid sequence SEQ ID NO: 1. In some embodiments, the protein or polypeptide for use according to the invention has the amino acid sequence SEQ ID NO: 2.

In one embodiment, fragments of the protein or polypeptide for use according to the invention are also included in the present invention. As used herein, the term "fragment" means a polypeptide having an amino acid sequence that is the same as part, but not all, of the amino acid sequence SEQ ID NO: 1 or SEQ ID NO: 2. Fragments may be "free-standing" or comprised within a larger polypeptide of which they form a part or region, most preferably as a single continuous region. Representative examples of polypeptide fragments of the invention, include, for example, fragments from about amino acid number 1-20, 21-40, 41-60, 61-80, 81-100, and 101 to the end of the polypeptide, said position number corresponding to the amino acid number of SEQ ID NO: 1 or SEQ ID NO: 2. In this context "about" includes the particularly recited ranges larger or smaller by several, 5, 4, 3, 2 or 1 amino acid at either extreme or at both extremes.

Preferred fragments include, but are not limited to, truncation polypeptides having the amino acid sequence of SEQ ID NO: 1 or SEQ ID NO: 2, except for deletion of a continuous series of residues that includes the amino terminus, or a continuous series of residues that includes the carboxyl terminus and/or transmembrane region or deletion of two continuous series of residues, one including the amino terminus and one including the carboxyl terminus. Also preferred are the fragments characterized by structural or functional attributes such as fragments that comprise alpha-helix and alpha-helix forming regions, beta-sheet and beta-sheet forming regions, turn and turn-forming regions, coil and coil-forming regions, hydrophilic regions, hydrophobic regions, alpha amphipathic regions, beta amphipathic regions, flexible regions, surface-forming regions, substrate binding region, and high antigenic index regions. Other preferred fragments are biologically active fragments. Biologically active fragments are those that mediate the protein or polypeptide activity, including those with a similar activity or an improved activity, or with a decreased undesirable activity.

In one embodiment, all of these protein or polypeptide fragments retain parts of the biological activity of the protein or polypeptide of the invention.

In one embodiment, variants of the protein or polypeptide for use according to the invention are also included in the present invention. Preferred variants are those that vary from the protein or polypeptide of the invention by conservative amino acid substitutions, i.e., those that substitute a residue with another of like characteristics. Typical such substitutions are among Ala, Val, Leu and Ile; among Ser and Thr; among the acidic residues Asp and Glu; among Asn and Gln; and among the basic residues Lys and Arg; or aromatic residues Phe and Tyr. Particularly preferred are variants in which several, 5-10, 1-5, or 1-2 amino acids are substituted, deleted, or added in any combination.

In one embodiment, the protein or polypeptide for use according to the invention has an amino sequence comprising a mutation leading to the replacement of Asparagine in a position corresponding to position 54 in the amino acid sequence of SEQ ID NO: 1 by Glutamine in order to prevent N-glycosylation. In one embodiment, the protein or polypeptide of the invention has an amino sequence comprising or consisting in the sequence of SEQ ID NO: 2.

In one embodiment, the protein or polypeptide for use according to the invention can be prepared in any suitable manner. Example of peptides prepared according to a suitable manner include, without being limited to, isolated naturally occurring polypeptides, recombinantly produced polypeptides, synthetically produced polypeptides, or polypeptides produced by a combination of these methods. Means for preparing such polypeptides are well understood in the art.

In some embodiments, the protein or polypeptide for use according to the invention is a fusion protein comprising (i) a polypeptide having at least 75% sequence identity with the amino acid sequence SEQ ID NO: 1 or SEQ ID NO: 2 and (ii) at least one distinct protein or polypeptide.

In one embodiment, the protein or polypeptide for use according to the invention is linked to at least one other protein or polypeptide in such a manner as to produce a single protein which retains the biological activity of the protein or polypeptide for use according to the invention.

In one embodiment, the polypeptides or proteins of the fusion protein may be fused in any order. In one embodiment, the polypeptides or proteins are disposed in a single, contiguous polypeptide chain.

In one embodiment, the fusion protein of the invention further comprises at least one peptide linker. In one embodiment, the polypeptides or proteins of the fusion protein of the invention are linked to each other through one or more peptide linkers.

In one embodiment, the peptide linker provides a greater physical separation between the two moieties and thus maximizes the availability of the protein or polypeptide for use according to the invention. The peptide linker may consist of amino acids such that it is flexible or more rigid.

In one embodiment, the peptide linker comprises from 5 to 50 amino acids, from 10 to 50 amino acids, from 15 to 50 amino acids, or from 20 to 50 amino acids. In another embodiment, the peptide linker comprises from 6, 7, 8, 9 or 10 to 20 amino acids. In another embodiment, the peptide linker comprises from 2 to 10 amino acids, from 5 to 20 amino acids, from 10 to 30 amino acids, or from 15 to 40 amino acids.

The peptide linker may be an in vivo cleavable linker or non-cleavable linker.

Fusion proteins of the invention may be obtained, for example, by solid-state peptide synthesis (e.g., Merrifield solid phase synthesis) or recombinant production. For recombinant production one or more nucleic acid encoding the fusion protein (fragment), e.g., as described hereinabove, is isolated and inserted into one or more vectors for further cloning and/or expression in a host cell. Such nucleic acid may be readily isolated and sequenced using conventional procedures.

Fusion proteins prepared as described herein may be purified by art-known techniques such as high-performance liquid chromatography, ion exchange chromatography, gel electrophoresis, affinity chromatography, size exclusion chromatography, and the like. The actual conditions used to purify a particular protein will depend, in part, on factors such as net charge, hydrophobicity, hydrophilicity etc., and will be apparent to those having skill in the art. For affinity chromatography purification an antibody, ligand, receptor or antigen can be used to which the fusion protein binds. The purity of the fusion protein can be determined by any of a variety of well-known analytical methods including gel electrophoresis, high pressure liquid chromatography, and the like.

The invention also relates to a fusion protein as described hereinabove, for use for preventing and/or treating brain inflammation.

In one embodiment, the nucleic acids encoding the fusion proteins of the invention may be expressed as a single nucleic acid that encodes the entire fusion protein or as multiple (e.g., two or more) nucleic acids that are co-expressed. Polypeptides encoded by nucleic acids that are co-expressed may associate through, e.g., disulfide bonds or other means, to form a functional fusion protein.

In some embodiments, the protein or polypeptide for use according to the invention prevents and/or treats brain inflammation. In some embodiments, the protein or polypeptide for use according to the invention prevents brain inflammation. In some embodiments, the protein or polypeptide for use according to the invention treats brain inflammation.

As used herein the term "brain inflammation", used interchangeably with the term "neuroinflammation", refers to the onset of inflammation in the central nervous system and may involve, inter alia, the activation of glial cells and the secretion of pro-inflammatory cytokines. The process of neuroinflammation affects neurons, microglia and macroglia.

In some embodiments, the brain inflammation comprises or consists of the release of proinflammatory mediators in the brain. Non limitative examples of proinflammatory cytokines include interleukins (IL) such as IL-1, IL-2, IL-12, IL-17 and IL-18; IFN-γ; and TNF-α.

In some embodiments, the brain inflammation comprises or consists of the early activation of resident microglia. As used herein, "microglia" refers to the resident macrophages of the central nervous system.

In some embodiments, the brain inflammation comprises or consists of the formation of reactive oxygen species (ROS). Non-limitative examples of ROS include superoxide, hydroxyl radical, singlet oxygen, nitrous oxide and peroxides (e.g., hydrogen peroxide). In some embodiments, the formation of ROS induces oxidative stress.

In some embodiments, the brain inflammation comprises or consists of infiltration of systemic inflammatory cells in the brain. In some embodiments, the systemic inflammatory cells are selected from the group comprising or consisting of neutrophils, eosinophils, lymphocytes, plasma cells, and histiocytes. In some embodiments, the systemic inflammatory cells are neutrophils.

In some embodiments, the brain inflammation is associated or induces excitotoxicity. As used herein, the term "excitotoxicity" refers to a state of abnormal stimulation of neurotransmitters receptors in a neuron, leading inter alia to altered calcium and energy homeostasis and apoptosis.

In some embodiments, the brain inflammation is associated with or induces neuronal cell death.

In one embodiment, the brain inflammation is localized to a specific region or area of the brain. Typically, the brain inflammation is localized at the site and/or at the periphery of a brain injury, e.g., a brain hemorrhage.

In another embodiment, the brain inflammation is not localized to a specific region or area of the brain. In certain embodiments, the brain inflammation affects all the brain.

In some embodiments, the brain inflammation is not associated with the presence or the formation of a thrombus. In some embodiments, the brain inflammation is not induced by the presence or the formation of a thrombus. In some embodiments, the brain inflammation does not lead to the presence or the formation of a thrombus. In some embodiments, the protein or polypeptide describes herein above is not used for preventing and/or treating thrombotic-related or thrombotic-induced diseases.

In some embodiments, the brain inflammation is an induced brain inflammation. In some embodiments, the induced brain inflammation is due to a brain injury. In some embodiments, the induced brain inflammation is due to a traumatic brain injury. In some embodiments, the brain inflammation is induced by a brain hemorrhage.

In some embodiments, the brain inflammation is due to a brain injury. In some embodiments, the brain injury is a traumatic brain injury. In some other embodiments, the brain injury is a non-traumatic brain injury.

In some embodiments, the brain inflammation is due to an acquired brain injury. In some embodiments, the acquired brain injury is a traumatic brain injury. In some other embodiments, the acquired brain injury is a non-traumatic brain injury.

In some embodiments, the traumatic brain injury is selected from the group comprising or consisting of hemorrhage, contusion, concussion, and penetrating brain injury. In some embodiments, the traumatic brain injury is hemorrhage.

In some embodiments, the non-traumatic brain injury is selected from the group comprising or consisting of brain hemorrhage, ischemic stroke, seizure, infection, brain tumor, hypoxic/anoxic brain injury, autoimmune disease, toxicity and hydrocephalus. In some embodiments, the non-traumatic brain injury is selected from the group comprising or consisting of brain hemorrhage, seizure, infection, brain tumor, hypoxic/anoxic brain injury, autoimmune disease, toxicity and hydrocephalus. In some embodiments, the non-traumatic brain injury is selected from the group comprising or consisting of brain hemorrhage, seizure, infection, hypoxic/anoxic brain injury, autoimmune disease, toxicity and hydrocephalus. In some embodiments, the non-traumatic brain injury is selected from the group comprising or consisting of brain hemorrhage, infection, brain tumor, hypoxic/anoxic brain injury, autoimmune disease, toxicity and hydrocephalus. In some embodiments, the non-traumatic brain injury is selected from the group comprising or consisting of brain hemorrhage, infection, hypoxic/anoxic brain injury, autoimmune disease, toxicity and hydrocephalus. In some embodiments, the non-traumatic brain injury is brain hemorrhage. In some embodiments, the non-traumatic brain injury is autoimmune disease.

In some embodiments, the infection is selected from the group comprising or consisting of viral infection, bacterial infection, fungal infection, parasitic infection, and combinations thereof. In some embodiments, the infection is induced by a septicemia and/or a sepsis. In some embodiments, the infection is a viral infection. In some embodiments, the infection is a bacterial infection. In some embodiments, the infection is a fungal infection. In some embodiments, the infection is a parasitic infection.

In some embodiments, the brain injury is selected from the group comprising or consisting of brain hemorrhage, contusion, concussion, penetrating brain injury, ischemic stroke, seizure, infection, brain tumor, hypoxic/anoxic brain injury, autoimmune disease, toxicity and hydrocephalus. In some embodiments, the brain injury is selected from the group comprising or consisting of brain hemorrhage, contusion, concussion, penetrating brain injury, seizure, infection, brain tumor, hypoxic/anoxic brain injury, autoimmune disease, toxicity and hydrocephalus. In some embodiments, the brain injury is selected from the group comprising or consisting of brain hemorrhage, contusion, concussion, penetrating brain injury, infection, brain tumor, hypoxic/anoxic brain injury, autoimmune disease, toxicity and hydrocephalus. In some embodiments, the brain injury is selected from the group comprising or consisting of brain hemorrhage, contusion, concussion, penetrating brain injury, seizure, infection, hypoxic/anoxic brain injury, autoimmune disease, toxicity and hydrocephalus.

In some embodiments, the brain inflammation occurred or is susceptible to occur after a traumatic brain injury. In some embodiments, the brain inflammation occurred or is susceptible to occur after a brain hemorrhage. In some embodiments, the protein or polypeptide according to the invention is for use for preventing and/or treating brain inflammation following brain hemorrhage in a subject in need thereof.

In a specific embodiment, the protein or polypeptide of the invention is for use for preventing brain inflammation that is susceptible to occur after a brain injury in a subject in need thereof. In a specific embodiment, the protein or polypeptide of the invention is for use for preventing brain inflammation that is susceptible to occur after a brain hemorrhage in a subject in need thereof.

In some embodiments, the brain inflammation is an acquired brain inflammation or a spontaneous brain inflammation.

In some embodiments, the brain inflammation is an acquired brain inflammation.

As used herein, the term "acquired brain inflammation" refers to a brain inflammation as described hereinabove wherein the cause triggering the inflammation is external to the organism, e.g., a mechanical shock to the head, an object penetrating the skull, or an infection.

In some embodiments, the acquired brain inflammation is induced by a traumatic brain injury or an infection.

In some embodiments, the acquired brain inflammation is induced by a traumatic brain injury.

In some embodiments the traumatic brain injury is selected from the group comprising or consisting of hemorrhage, contusion, concussion, penetrating brain injury, and anoxic brain injury. In some embodiments, the traumatic brain injury is selected from the group comprising or consisting of hemorrhage, contusion, concussion, and penetrating brain injury.

In some embodiments the traumatic brain injury is a hemorrhage selected from the group comprising or consisting of intracerebral hemorrhage, subarachnoid hemorrhage, subdural hemorrhage and epidural hemorrhage. In some embodiments the primary brain injury is an intracerebral hemorrhage. In some embodiments the primary brain injury is a subarachnoid hemorrhage. In some embodiments the primary brain injury is a subdural hemorrhage. In some embodiments the primary brain injury is an epidural hemorrhage.

In some embodiments the traumatic brain injury is a contusion. In some embodiments the traumatic brain injury is a concussion. In some embodiments the traumatic brain injury is a penetrating brain injury. In some embodiments the traumatic brain injury is an anoxic brain injury.

In some embodiments, the acquired brain inflammation is induced by an infection. In some embodiments, the acquired brain inflammation is induced by an infection selected from the group comprising or consisting of viral infection, bacterial infection, fungal infection, parasitic infection, and combinations thereof.

In some embodiments, the acquired brain inflammation is induced by a septicemia and/or a sepsis.

In some embodiments, the acquired brain inflammation is induced by a viral infection. Non-limitative examples of viral infections enabling brain inflammation comprise infections by herpes simplex virus, Epstein-Barr virus, cytomegalovirus, varicella virus, poliovirus, influenza virus, SARS-COV-2, West Nile virus, enterovirus, Chikungunya virus and Dengue virus.

In some embodiments, the acquired brain inflammation is induced by a bacterial infection. Non-limitative examples of bacterial infections enabling brain inflammation comprise infections by bacteria of the genus *Treponema, Mycoplasma, Neisseria, Streptococcus* and *Listeria*.

In some embodiments, the acquired brain inflammation is induced by a fungal infection. Non-limitative examples of fungal infections enabling brain inflammation comprise infections by fungi of the genus *Candida, Cladosporium, Cryptococcus, Histoplasma* and *Aspergillus*.

In some embodiments, the acquired brain inflammation is induced by a parasitic infection. Non-limitative examples of parasitic infections enabling brain inflammation comprise infections by parasites of the genus *Plasmodium* and *Toxoplasma*.

In some embodiments, the brain inflammation is a spontaneous brain inflammation.

As used herein, the term "spontaneous brain inflammation" refers to a brain inflammation as described hereinabove wherein the cause triggering the inflammation is intrinsic to the organism and results, e.g., from an autonomous disease or condition.

In some embodiments, the spontaneous brain inflammation is induced by a non-traumatic brain injury or an autoimmune disease.

In some embodiments, the spontaneous brain inflammation is induced by a non-traumatic brain injury. In certain embodiments, the non-traumatic brain injury is selected from the group comprising or consisting of spontaneous hemorrhage, brain cancer and stroke.

In some embodiments the non-traumatic brain injury is a non-traumatic spontaneous hemorrhage. In certain embodiments, the non-traumatic spontaneous hemorrhage is a non-traumatic spontaneous intracerebral hemorrhage or a spontaneous subarachnoid hemorrhage. In certain embodiments, the non-traumatic spontaneous hemorrhage is a non-traumatic spontaneous intracerebral hemorrhage. In certain embodiments, the non-traumatic spontaneous hemorrhage is a spontaneous subarachnoid hemorrhage.

In some embodiments the non-traumatic brain injury is a brain cancer, e.g., glioblastoma, oligodendroglioma and meningioma.

In some embodiments the non-traumatic brain injury is a stroke. In some embodiments the non-traumatic brain injury is an ischemic stroke.

In some embodiments, the spontaneous brain inflammation is induced by an autoimmune disease. In some embodiments, the autoimmune disease is autoimmune encephalitis. In some embodiments, the non-traumatic brain injury is induced by an autoimmune disease. In some embodiments, the autoimmune disease is autoimmune encephalitis.

Brain inflammation may be associated with, or induced by, other conditions or symptoms such as, e.g., neuronal cell death, excitotoxicity, microglia activation, oxidative stress and infiltration of the brain by systemic inflammatory cells such as neutrophils.

In some embodiments, preventing and/or treating brain inflammation using the protein or polypeptide according to the invention further treats and/or alleviates another disease, condition or symptom. In some embodiments, the disease, condition or symptom is associated with brain inflammation. In some embodiments, the disease, condition or symptom is induced by brain inflammation.

In some embodiments, the protein or polypeptide further prevents and/or treats a disease, condition or symptom associated with brain inflammation. In some embodiments, the protein or polypeptide further prevents and/or treats a disease, condition or symptom induced by brain inflammation.

In some embodiments, preventing and/or treating brain inflammation using the protein or polypeptide according to the invention has a positive effect on another disease, condition or symptom selected from the group comprising or consisting of neuronal cell death, excitotoxicity, microglia activation, oxidative stress and infiltration of the brain by systemic inflammatory cells. In some embodiments, the disease, condition or symptom is selected from the group comprising or consisting of neuronal cell death, excitotoxicity, microglia activation, and oxidative stress. As used herein, the expression "positive effect" is intended to mean that the protein or polypeptide according to the invention alleviates, decreases or suppresses a symptom, or treats partially or entirely a component of the disease or condition.

In some embodiments, preventing and/or treating brain inflammation using the protein or polypeptide according to the invention has a positive effect on neuronal cell death. In some embodiments, preventing and/or treating brain inflammation using the protein or polypeptide according to the invention has a positive effect on excitotoxicity.

In some embodiments, preventing and/or treating brain inflammation using the protein or polypeptide according to the invention has a positive effect on microglia activation.

In some embodiments, preventing and/or treating brain inflammation using the protein or polypeptide according to the invention has a positive effect on oxidative stress. In some embodiments, preventing and/or treating brain inflammation using the protein or polypeptide according to the invention inhibits the formation of reactive oxygen species.

In some embodiments, preventing and/or treating brain inflammation using the protein or polypeptide according to the invention has a positive effect on the infiltration of the brain by systemic inflammatory cells. In certain embodiments the systemic inflammatory cells are selected from the group comprising or consisting of neutrophils, eosinophils, lymphocytes, plasma cells, and histiocytes. In certain embodiments the systemic inflammatory cells are neutrophils. In some embodiments, preventing and/or treating brain inflammation using the protein or polypeptide according to the invention inhibits the recruitment of neutrophils to the brain and/or the formation of neutrophils extracellular traps in the brain.

In some embodiments, the protein or polypeptide for use according to the invention is for preventing and/or treating the long-term effects of a brain injury. As used herein, the expression "long-term effects of a brain injury" refers to the pathophysiological consequences of a brain injury, i.e., the damages impacting at least one cell type in the brain, preferably neurons, for a prolonged period of time, typically one week, one month, one year or more. In some embodiment, the protein or polypeptide for use according to the invention is for preventing and/or treating the long-term effects of a non-traumatic brain injury. In some embodiment, the protein or polypeptide for use according to the invention is for preventing and/or treating the long-term effects of a traumatic brain injury. In some embodiments, the protein or polypeptide for use according to the invention is for preventing and/or treating the long-term effects of a traumatic brain injury associated to hemorrhage. In some embodiments, the protein or polypeptide for use according to the invention is for preventing and/or treating the long-term effects of a brain injury associated to hemorrhage. In some embodiment, the protein or polypeptide for use according to the invention is for preventing and/or treating the long-term effects of a brain hemorrhage.

The Inventors have demonstrated that the administration of the protein or polypeptide of the invention does not increase the hemorrhagic volume nor the lesion (oedema) volume. This property is advantageous while being surprising when one knows the anti-thrombotic effects of this protein.

In certain embodiments, the protein or polypeptide of the invention is for use in preventing and/or treating brain inflammation without increasing hemorrhagic and/or lesion (oedema) volumes. In certain embodiments, the brain inflammation is due to or induced by a cerebral hemorrhage. In one embodiment, the protein or polypeptide of the invention is for use in preventing and/or treating cerebral injury after cerebral hemorrhage. In one embodiment, cerebral injury arises after hemorrhagic stroke. In one embodiment, the protein or polypeptide of the invention is for use in preventing and/or treating long-term effect brain injury after cerebral hemorrhage.

The present invention further relates to a nucleic acid molecule encoding the protein or polypeptide for use according to the invention.

In some embodiments, the nucleic acid is for preventing and/or treating brain inflammation or a disease associated with brain inflammation. In some embodiments, the nucleic acid is for preventing and/or treating brain inflammation.

In some embodiments, the nucleic acid molecule is a DNA molecule or a RNA molecule.

In some embodiments, the nucleic acid molecule is a DNA molecule. In some embodiments, the nucleic acid molecule is selected from the group comprising or consisting of a plasmid, a naked DNA, a cosmid, a fosmid, a prokaryotic chromosome (e.g., bacterial artificial chromosome), a eukaryotic chromosome (e.g., yeast artificial chromosome or human artificial chromosome), or combinations thereof.

In some embodiments, the nucleic acid molecule is a RNA molecule. In some embodiments, the nucleic acid molecule is a messenger RNA (mRNA).

In some embodiments, the nucleic acid molecule comprises or consists of natural nucleotides, non-natural nucleotides, or combinations thereof. In some embodiments, the nucleic acid molecule comprises or consists of natural nucleotides. In some embodiments, the natural nucleotides are selected from the group comprising or consisting of adenine, guanine, cytosine, thymine and uracil. In some embodiments, the natural nucleotides are selected from the group comprising or consisting of adenine, guanine, cytosine and thymine. In some embodiments, the natural nucleotides are selected from the group comprising or consisting of adenine, guanine, cytosine and uracil. In some embodiments, the nucleic acid molecule comprises or consists of non-natural nucleotides (e.g., chemically modified).

In some embodiments, the nucleic acid molecule is single-stranded, double-stranded, or combinations thereof. In some embodiments, the nucleic acid molecule is single-stranded. In some embodiments, the nucleic acid molecule is double-stranded.

In some embodiments, the nucleic acid of the invention has a nucleotide sequence comprising or consisting in the sequence SEQ ID NO: 3 or in a sequence with at least 70%, 75%, 80%, 85%, 90%, 95%, 96%, 97%, 98%, 99% or 100% identity with SEQ ID NO: 3. In one embodiment, the nucleic acid encoding the protein or polypeptide for use according to the invention has the nucleotide sequence as set forth in SEQ ID NO: 3.

In one embodiment, the nucleic acid encoding the fusion proteins of the invention may be expressed as a single nucleic acid that encodes the entire fusion protein or as multiple (i.e., two or more) nucleic acids that are co-expressed. Polypeptides encoded by nucleic acids that are co-expressed may associate through, e.g., disulfide bonds or other means, to form a functional fusion protein.

Another object of the present invention is a vector comprising one or more nucleic acid encoding the protein or polypeptide of the invention, and its use for preventing and/or treating brain inflammation, and/or diseases associated with brain inflammation. In a preferred embodiment, the vector of the invention is an expression vector.

The invention further relates to a composition comprising a protein or polypeptide, a nucleic acid or nucleic acid, or a vector as described hereinabove.

The present invention further relates to a pharmaceutical composition comprising the protein or polypeptide for use according to the invention, the nucleic acid for use according to the invention, the vector for use according to the invention or the composition for use according to the invention, and at least one pharmaceutically acceptable excipient. In one embodiment, the pharmaceutical composition according to the present invention is for preventing and/or treating a brain inflammation in a subject in need thereof, as described hereinabove.

In some embodiments, the pharmaceutical composition comprises the protein or polypeptide for use according to the invention and at least one pharmaceutically acceptable excipient.

In some embodiments, the pharmaceutical composition comprises a protein or polypeptide comprising a polypeptide that has at least 75% sequence identity with the amino acid sequence SEQ ID NO: 1 and at least one pharmaceutically acceptable excipient for use for preventing and/or treating brain inflammation. In some embodiments, the pharmaceutical composition comprises a protein or polypeptide having the amino acid sequence as set forth in SEQ ID NO: 1 and at least one pharmaceutically acceptable excipient for use for preventing and/or treating brain inflammation.

Pharmaceutically acceptable excipients that may be used in these compositions include, but are not limited to, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances (for example sodium carboxymethylcellulose), polyethylene glycol, polyacrylates, waxes, polyethylene-polyoxypropylene-block polymers, polyethylene glycol and wool fat.

In some embodiments, the pharmaceutical composition further comprises another therapeutic agent.

In some embodiments, the further therapeutic agent has a positive effect on a disease, condition or symptom selected from the group comprising or consisting of brain inflammation, neuronal cell death, excitotoxicity, microglia activation and oxidative stress. In some embodiments, the further therapeutic agent has a positive effect on brain inflammation.

In some embodiments, the further therapeutic agent is a drug. In some embodiments, the further therapeutic agent is an anti-inflammatory drug, such as minocycline or a statin.

In some embodiments, the further therapeutic agent comprises or consist of a cell therapy, such as a stem cell therapy.

The present invention further relates to a protein or polypeptide, a nucleic acid or nucleic acid, a vector, a composition, or a pharmaceutical composition as described hereinabove for the manufacture of a medicament for preventing and/or treating brain inflammation.

Another object of the invention is a medicament comprising a protein or polypeptide, a nucleic acid or nucleic acid, a vector, a composition, or a pharmaceutical composition as described hereinabove, for preventing and/or treating brain inflammation.

In one embodiment, the pharmaceutical composition or the medicament of the invention comprises a therapeutically effective amount of the protein or polypeptide, the nucleic acid or nucleic acid, or of the vector as described hereinabove.

It will be understood that the total daily usage of the protein or polypeptide, nucleic acid, vector, composition, pharmaceutical composition, or medicament according to the invention will be decided by the attending physician within the scope of sound medical judgment. The specific therapeutically effective dose level for any particular patient will depend upon a variety of factors including the disorder being treated and the severity of the brain inflammation; activity of the specific agent employed; the specific composition employed, the age, body weight, general health, sex and diet of the patient; the time of administration, route of administration, and rate of excretion of the specific agent employed; the duration of the treatment; drugs used in combination or coincidental with the specific agent employed; and like factors well known in the medical arts. For example, it is well within the skill of the art to start doses of the agent at levels lower than those required to achieve the desired therapeutic effect and to gradually increase the dosage until the desired effect is achieved. However, the daily dosage of the products may be varied over a wide range from about 10 to about 10000 mg per adult per day, preferably 100 to about 5000, more preferably from about 200 to about 2000 mg per adult per day. Preferably, the compositions contain 10, 50, 100, 250, 500, 1000 and 2,000 mg of the active ingredient for the symptomatic adjustment of the dosage to the patient to be treated. A medicament typically contains from about 10 to about 10000 mg of the active ingredient, preferably 5 to about 5000, more preferably from about 10 to about 2000 mg of the active ingredient. An effective amount of the drug is ordinarily supplied at a dosage level from 0.01 mg/kg to about 100 mg/kg of body weight per day, preferably from about 0.05 mg/kg to 40 mg/kg of body weight per day, more preferably from about 0.1 mg/kg to 20 mg/kg of body weight per day, more preferably from about 0.2 mg/kg to 1 mg/kg of body weight per day.

In some embodiments, the protein or polypeptide, composition or pharmaceutical composition according to the invention is administered at a dose from about 2.5 mg/kg/day to about 250 mg/kg/day, preferably from about 2.5 mg/kg/day to about 100 mg/kg/day, more preferably from about 2.5 mg/kg/day to about 50 mg/kg/day, more preferably from about 2.5 mg/kg/day to about 25 mg/kg/day. In some embodiments, the protein or polypeptide, composition or pharmaceutical composition according to the invention is administered at a dose from about 5 mg/kg/day to about 50 mg/kg/day. In some embodiments, the protein or polypeptide, composition or pharmaceutical composition according to the invention is administered at a dose from about 10 mg/kg/day to about 50 mg/kg/day. In some embodiments, the protein or polypeptide, composition or pharmaceutical composition according to the invention is administered at a dose of about 25 mg/kg/day.

In some embodiments, the protein or polypeptide, composition or pharmaceutical composition according to the invention is administered at a dose from about 20 mg to about 200,000 mg per adult per day, preferably from about 20 mg to about 20,000 mg per adult per day, more preferably from about 20 mg to about 10,000 mg per adult per day. In some embodiments, the protein or polypeptide, composition or pharmaceutical composition according to the invention is administered at a dose from about 200 mg to about 200,000 mg per adult per day, preferably from about 200 mg to about 20,000 mg per adult per day, more preferably from about 200 mg to about 10,000 mg per adult per day. In some embodiments, the protein or polypeptide, composition or pharmaceutical composition according to the invention is administered at a dose of about 2000 mg per adult per day.

The Inventors have shown the possibility and the safety of administering the protein of the invention rapidly after the appearance of the brain inflammation, brain injury or brain hemorrhage. It is particularly beneficial for patients with brain inflammation, brain injury or brain hemorrhage but susceptible to thrombotic events, such as for example bed-ridden patients. Indeed, during the first 72 hours after the onset of hemorrhage, anticoagulants (such as enoxaparin) cannot be given because they increase the risk of bleeding. The Inventors have demonstrated that the risk of bleeding is not increased with the protein of the invention during the 3 days after the onset of hemorrhage, unlike enoxaparin (see Example 1). It is therefore possible to treat brain inflammation and/or brain injury with the protein of the invention within a crucial time window to avoid irreversible effects. For best results, the therapeutic solution to brain inflammation must be provided before the inflammatory reaction sets in after the onset of bleeding. Current solutions cannot be administered as quickly because of their increased risk of bleeding. The protein or polypeptide of the invention does not have this disadvantage, on the contrary, and can therefore be administered quickly to reduce the inflammatory reaction before it leads to too harmful and/or permanent effects.

Moreover, the peak of neutrophil infiltration occurs within this 72-hour window, as well as the rapid growth phase of the edema if any. The sooner the size of the edema is reduced, the better the patient outcome.

Therefore, in some embodiments, the protein or polypeptide, nucleic acid, vector, composition, pharmaceutical composition, or medicament according to the invention is administered as soon as possible after the onset of brain inflammation and/or after brain injury. In some embodiments, the protein or polypeptide, nucleic acid, vector, composition, pharmaceutical composition, or medicament according to the invention is administrated to the subject rapidly after being exposed to a risk to develop brain inflammation. In some embodiments, the protein or polypeptide, nucleic acid, vector, composition, pharmaceutical composition, or medicament according to the invention is administered within 120 hours from the onset of brain inflammation and/or after a brain injury, preferably within 96 hours, more preferably within 72 hours. In some embodiments, the protein or polypeptide, nucleic acid, vector, composition, pharmaceutical composition, or medicament according to the invention is administered within 48 hours from the onset of brain inflammation and/or after a brain injury, preferably within 24 hours, more preferably within 12 hours. In some embodiments, the protein or polypeptide, nucleic acid, vector, composition, pharmaceutical composition, or medicament according to the invention is administered within the first 10 hours from the onset of brain inflammation and/or after a brain injury, preferably within the first 9 hours, more preferably within the first 8 hours, even more preferably within the first 7 hours, even more preferably within the first 6 hours. In other words, in one embodiment, the protein or polypeptide, nucleic acid, vector, composition, pharmaceutical composition, or medicament according to the invention is administered from about 0 hours to about 120 hours after the onset of brain inflammation and/or after a brain injury, preferably within 96 hours, more preferably within 72 hours, more preferably within 48 hours, more preferably within 24 hours, more preferably within 12 hours, more preferably within 10 hours, more preferably within 9 hours, more preferably within 8 hours, more preferably within 7 hours, more preferably within 6 hours.

Therefore, in some embodiments, the protein or polypeptide, nucleic acid, vector, composition, pharmaceutical composition, or medicament according to the invention is administered as soon as possible after the onset of brain hemorrhage. In some embodiments, the protein or polypeptide, nucleic acid, vector, composition, pharmaceutical composition, or medicament according to the invention is administrated to the subject rapidly after a brain hemorrhage. In some embodiments, the protein or polypeptide, nucleic acid, vector, composition, pharmaceutical composition, or medicament according to the invention is administered within 120 hours after the onset of brain hemorrhage, preferably within 96 hours, more preferably within 72 hours. In some embodiments, the protein or polypeptide, nucleic acid, vector, composition, pharmaceutical composition, or medicament according to the invention is administered within 48 hours after the onset of brain hemorrhage, preferably within 24 hours, more preferably within 12 hours. In some embodiments, the protein or polypeptide, nucleic acid, vector, composition, pharmaceutical composition, or medicament according to the invention is administered within the first 10 hours after the onset of brain hemorrhage, preferably within the first 9 hours, more preferably within the first 8 hours, even more preferably within the first 7 hours, even more preferably within the first 6 hours. In other words, in one embodiment, the protein or polypeptide, nucleic acid, vector, composition, pharmaceutical composition, or medicament according to the invention is administered within about 0 hours to about 120 hours after the onset of brain hemorrhage, preferably within 96 hours, more preferably within 72 hours, more preferably within 48 hours, more preferably within 24 hours, more preferably within 12 hours, more preferably within 10 hours, more preferably within 9 hours, more preferably within 8 hours, more preferably within 7 hours, more preferably within 6 hours.

It is to be understood that the sooner the protein or polypeptide, nucleic acid, vector, composition, pharmaceutical composition, or medicament according to the invention is administered, the better the clinical outcomes.

Therefore, in some embodiments, the protein or polypeptide, nucleic acid, vector, composition, pharmaceutical composition, or medicament according to the invention is administered within about 0 hours, 1 hour, 2 hours, 3 hours, 4 hours, 5 hours, 6 hours, 7 hours, 8 hours, 9 hours, 10 hours, 12 hours, 24 hours or 48 hours to about 120 hours, 96 hours or 72 hours after the onset of brain inflammation and/or after a brain injury.

Therefore, in some embodiments, the protein or polypeptide, nucleic acid, vector, composition, pharmaceutical composition, or medicament according to the invention is administered within about 0 hours, 1 hour, 2 hours, 3 hours, 4 hours, 5 hours, 6 hours, 7 hours, 8 hours, 9 hours, 10 hours, 12 hours, 24 hours or 48 hours to about 120 hours, 96 hours or 72 hours after the onset of brain hemorrhage.

In one embodiment, the protein or polypeptide, nucleic acid, vector, composition, pharmaceutical composition, or medicament according to the invention is administered from about 24 hours to about 120 hours after the onset of brain inflammation and/or after a brain injury, preferably from about 24 hours to about 96 hours, more preferably from about 24 hours to about 72 hours. In one embodiment, the protein or polypeptide, nucleic acid, vector, composition, pharmaceutical composition, or medicament according to the invention is administered from about 48 hours to about 120 hours after the onset of brain inflammation and/or after a brain injury, preferably from about 48 hours to about 96 hours, more preferably from about 48 hours to about 72 hours.

In one embodiment, the protein or polypeptide, nucleic acid, vector, composition, pharmaceutical composition, or medicament according to the invention is administered within about 24 hours to about 120 hours after the onset of brain hemorrhage, preferably within about 24 hours to about 96 hours, more preferably within about 24 hours to about 72 hours. In one embodiment, the protein or polypeptide, nucleic acid, vector, composition, pharmaceutical composition, or medicament according to the invention is administered within about 48 hours to about 120 hours after the onset of brain hemorrhage, preferably within about 48 hours to about 96 hours, more preferably within about 48 hours to about 72 hours.

In some embodiments, the protein or polypeptide, nucleic acid, vector, composition, pharmaceutical composition, or medicament according to the invention is administered from about 0 hour to about 72 hours after the onset of brain inflammation and/or after a brain injury, preferably from about 2 hours to about 48 hours, preferably from about 4 hours to about 36 hours, more preferably from about 6 hours to about 12 hours. In some embodiments, the protein or polypeptide, nucleic acid, vector, composition, pharmaceutical composition, or medicament according to the invention is administered from about 4 hours to about 48 hours after the onset of brain inflammation and/or after a brain injury, preferably from about 4 hours to about 36 hours, more preferably from about 4 hours to about 12 hours, even more preferably from about 4 hours to about 8 hours. In some embodiments, the protein or polypeptide, nucleic acid, vector, composition, pharmaceutical composition, or medicament according to the invention is administered from about 6 hours to about 48 hours after the onset of brain inflammation and/or after a brain injury, preferably from about 6 hours to about 36 hours, more preferably from about 6 hours to about 12 hours, even more preferably from about 6 hours to about 8 hours.

In some embodiments, the protein or polypeptide, nucleic acid, vector, composition, pharmaceutical composition, or medicament according to the invention is administered within about 0 hour to about 72 hours after the onset of brain hemorrhage, preferably within about 2 hours to about 48 hours, preferably from about 4 hours to about 36 hours, more preferably within about 6 hours to about 12 hours. In some embodiments, the protein or polypeptide, nucleic acid, vector, composition, pharmaceutical composition, or medicament according to the invention is administered within about 4 hours to about 48 hours after the onset of brain hemorrhage, preferably within about 4 hours to about 36 hours, more preferably within about 4 hours to about 12 hours, even more preferably within about 4 hours to about 8 hours. In some embodiments, the protein or polypeptide, nucleic acid, vector, composition, pharmaceutical composition, or medicament according to the invention is administered within about 6 hours to about 48 hours after the onset of brain hemorrhage, preferably within about 6 hours to about 36 hours, more preferably within about 6 hours to about 12 hours, even more preferably within about 6 hours to about 8 hours.

In some embodiments, the protein or polypeptide, nucleic acid, vector, composition, pharmaceutical composition, or medicament according to the invention is administered from about 0 hours to about 12 hours after the onset of brain inflammation and/or after a brain injury, preferably from about 0 hours to about 10 hours, more preferably from about 0 hours to about 8 hours, even more preferably from about 0 hours to about 7 hours, even more preferably from about 0 hours to about 6 hours.

In some embodiments, the protein or polypeptide, nucleic acid, vector, composition, pharmaceutical composition, or medicament according to the invention is administered within about 0 hours to about 12 hours after the onset of brain hemorrhage, preferably within about 0 hours to about 10 hours, more preferably within about 0 hours to about 8 hours, even more preferably within about 0 hours to about 7 hours, even more preferably within about 0 hours to about 6 hours.

In some embodiments, the protein or polypeptide, nucleic acid, vector, composition, pharmaceutical composition, or medicament according to the invention is administered at most 120 hours after the onset of brain inflammation and/or after a brain injury, preferably at most 96 hours, more preferably at most 72 hours. In some embodiments, the protein or polypeptide, nucleic acid, vector, composition, pharmaceutical composition, or medicament according to the invention is administered at most 48 hours after the onset of brain inflammation and/or after a brain injury, preferably at most 24 hours, more preferably at most 12 hours, even more preferably at most 8 hours, even more preferably at most 7 hours, even more preferably at most 6 hours or less.

In some embodiments, the protein or polypeptide, nucleic acid, vector, composition, pharmaceutical composition, or medicament according to the invention is administered at most 120 hours after the onset of brain hemorrhage, preferably at most 96 hours, more preferably at most 72 hours. In some embodiments, the protein or polypeptide, nucleic acid, vector, composition, pharmaceutical composition, or medicament according to the invention is administered at most 48 hours after the onset of brain hemorrhage, preferably at most 24 hours, more preferably at most 12 hours, even more preferably at most 8 hours, even more preferably at most 7 hours, even more preferably at most 6 hours or less.

For use in administration to a subject, the protein or polypeptide, nucleic acid, vector, composition, pharmaceutical composition, or medicament according to the invention will be formulated for administration to the subject. The protein or polypeptide, nucleic acid, vector, composition, pharmaceutical composition, or medicament according to the invention may be administered orally, parenterally, topically, by inhalation spray, rectally, nasally, buccally, vaginally or via an implanted reservoir. The term administration used herein includes subcutaneous, intravenous, intramuscular, intraocular, intra-articular, intra-synovial, intrasternal, intrathecal, intrahepatic, intralesional and intracranial injection or infusion techniques.

In one embodiment, the protein or polypeptide, nucleic acid, vector, composition, pharmaceutical composition, or medicament according to the invention is in a form adapted for topical administration.

Examples of forms adapted for topical administration include, but are not limited to, liquid, paste or solid compositions, and more particularly in form of aqueous solutions, drops, eye drops, ophthalmic solutions, dispersions, sprays, microcapsules, micro- or nanoparticles, polymeric patch, or controlled-release patch.

In one embodiment, the protein or polypeptide, nucleic acid, vector, composition, pharmaceutical composition, or medicament according to the invention comprises one or more pharmaceutical acceptable carrier for a formulation adapted for topical administration.

In one embodiment, the protein or polypeptide, nucleic acid, vector, composition, pharmaceutical composition, or medicament according to the invention is in a form adapted for injection, such as, for example, for intraocular, intramuscular, subcutaneous, intradermal, transdermal or intravenous injection or infusion.

Examples of forms adapted for injection include, but are not limited to, solutions, such as, for example, sterile aqueous solutions, dispersions, emulsions, suspensions, solid forms suitable for using to prepare solutions or suspensions upon the addition of a liquid prior to use, such as, for example, powder, liposomal forms and the like.

Sterile injectable forms of the protein or polypeptide, nucleic acid, vector, composition, pharmaceutical composition, or medicament according to the invention may be aqueous or an oleaginous suspension. These suspensions may be formulated according to techniques known in the art using suitable dispersing or wetting agents and suspending agents. The sterile injectable preparation may also be a sterile injectable solution or suspension in a non-toxic parenterally acceptable diluent or solvent. Among the acceptable vehicles and solvents that may be employed are water, Ringer's solution and isotonic sodium chloride solution. In addition, sterile, fixed oils are conventionally employed as a solvent or suspending medium. For this purpose, any bland fixed oil may be employed including synthetic mono- or diglycerides. Fatty acids, such as oleic acid and its glyceride derivatives are useful in the preparation of injectables, as are natural pharmaceutically acceptable oils, such as olive oil or castor oil, especially in their polyoxyethylated versions. These oil solutions or suspensions may also contain a long-chain alcohol diluent or dispersant, such as carboxymethyl cellulose or similar dispersing agents that are commonly used in the formulation of pharmaceutically acceptable dosage forms including emulsions and suspensions. Other commonly used surfactants, such as Tweens, Spans and other emulsifying agents or bioavailability enhancers which are commonly used in the manufacture of pharmaceutically acceptable solid, liquid, or other dosage forms may also be used for the purposes of formulation.

In one embodiment, the protein or polypeptide, nucleic acid, vector, composition, pharmaceutical composition, or medicament according to the invention is administered to the subject in need thereof at least once a day. For example, the composition, pharmaceutical composition, or medicament of the invention may be administered once a day, twice a day, or three times a day. In a preferred embodiment, the composition, pharmaceutical composition, or medicament of the invention is administered to the subject in need thereof once a day.

In another embodiment, the protein or polypeptide, nucleic acid, vector, composition, pharmaceutical composition, or medicament according to the invention is administered to the subject in need thereof at least once a week. For example, the composition, pharmaceutical composition, or medicament of the invention may be administered once a week, twice a week, three times a week, four times a week or up to seven times a week.

In another embodiment, the protein or polypeptide, nucleic acid, vector, composition, pharmaceutical composition, or medicament according to the invention is administered to the subject in need thereof once a month, two times a month, every two months, every two or three months, two times a year or once a year.

In one embodiment, the protein or polypeptide, nucleic acid, vector, composition, pharmaceutical composition, or medicament according to the invention is administered to the subject in need thereof before being exposed to a risk to develop brain inflammation. In one embodiment, the term "before" means at least a week before the exposure. In another embodiment, the term "before" means five days, four days, three days, two days or one day before the exposure. In another embodiment, the term "before" means 24 hours, 18 hours, 15 hours, 12 hours, 6 hours, 4 hours, 2 hours or 1 hour before the exposure. In another embodiment, the term "before" means less than one hour before the exposure, such as 45 minutes, 30 minutes, 15 minutes, 10 minutes, 5 minutes before the exposure or at the moment of the exposure.

In another embodiment, the protein or polypeptide, nucleic acid, vector, composition, pharmaceutical composition, or medicament according to the invention is administered to the subject in need thereof after being exposed to a risk to develop brain inflammation. In one embodiment, the term "after" means 5 minutes, 10 minutes, 15 minutes, 30 minutes, or 45 minutes after the exposure. In another embodiment, the term "after" means 1 hour, 2, 4, 6, 12, 15, 18 or 14 hours after the exposure. In another embodiment, the term "after" means 1 day, 2, 3, 4 or five days after the exposure. In another embodiment, the term "after" means a week or more after the exposure.

In some embodiments, the protein or polypeptide, nucleic acid, vector, composition, pharmaceutical composition, or medicament according to the invention is administered continuously, typically it is administered by perfusion.

In some embodiments, protein or polypeptide, nucleic acid, vector, composition, pharmaceutical composition, or medicament according to the invention is administered continuously, preferably by perfusion, for about 12 hours to about 96 hours, preferably for about 18 hours to about 84 hours, more preferably for about 12 hours to about 72 hours.

In some embodiments, protein or polypeptide, nucleic acid, vector, composition, pharmaceutical composition, or medicament according to the invention is administered continuously, preferably by perfusion, for about 24 hours to about 96 hours, preferably for about 48 hours to about 96 hours. In some embodiments, protein or polypeptide, nucleic acid, vector, composition, pharmaceutical composition, or medicament according to the invention is administered continuously, preferably by perfusion, for about 24 hours to about 72 hours, preferably for about 48 hours to about 72 hours.

In some embodiments, protein or polypeptide, nucleic acid, vector, composition, pharmaceutical composition, or medicament according to the invention is administered continuously, preferably by perfusion, for at least about 12 hours, 24 hours, 36 hours, 48 hours, 72 hours or 96 hours. In a particular embodiment, protein or polypeptide, nucleic acid, vector, composition, pharmaceutical composition, or medicament according to the invention is administered continuously, preferably by perfusion, for at least 48 hours.

In some embodiments, the subject is administered with a first dose of the protein or polypeptide, nucleic acid, vector, composition, pharmaceutical composition, or medicament according to the invention, and is then perfused with the same for continuous administration. Within the scope of the present invention, the first dose is hereby referred to as the initial dose. In some embodiments, the dosage of the protein or polypeptide, nucleic acid, vector, composition, pharmaceutical composition, or medicament according to the invention in the initial dose is higher or equal, preferably higher, than the dosage in the perfusion.

The present invention also relates to a kit comprising a protein or polypeptide, nucleic acid, vector, composition, pharmaceutical composition, or medicament according to the invention, for preventing and/or treating brain inflammation.

In one embodiment, the kit of the invention further comprises means to administer the protein or polypeptide, nucleic acid, vector, composition, pharmaceutical composition, or medicament according to the invention to a subject in need thereof.

In one embodiment, the kit of the invention further comprises instructions for the administration of the protein or polypeptide, nucleic acid, vector, composition, pharmaceutical composition, or medicament according to the invention to said subject.

The present invention further relates to a method for preventing and/or treating brain inflammation in a subject in need thereof, comprising administering to the subject a therapeutically effective amount of the protein or polypeptide having at least 75% sequence identity with the amino acid sequence SEQ ID NO: 1 or SEQ ID NO: 2, a nucleic acid encoding such protein or polypeptide, a vector comprising such nucleic acid, a pharmaceutical composition comprising such protein or polypeptide, nuclei acid or vector, or a medicament according to the invention.

In some embodiments, the method comprises administering to the subject a therapeutically effective amount of the protein or polypeptide, or the pharmaceutical composition according to the invention. In one embodiment, the therapeutically effective dose consists of a dose from about 2.5 mg/kg/day to about 250 mg/kg/day. In one embodiment, the therapeutically effective dose consists of a dose from about 2.5 mg/kg/day to about 100 mg/kg/day. In one embodiment, the therapeutically effective dose consists of a dose from about 2.5 mg/kg/day to about 50 mg/kg/day. In one embodiment, the therapeutically effective dose consists of a dose from about 2.5 mg/kg/day to about 25 mg/kg/day. In one embodiment, the therapeutically effective dose consists of a dose from about 5 mg/kg/day to about 50 mg/kg/day.

In some embodiments, the method comprises administering to the subject a therapeutically effective amount of the protein or polypeptide, or the pharmaceutical composition according to the invention, within 120 hours from the onset of brain inflammation and/or after a brain injury, preferably within 96 hours, more preferably within 72 hours. In other words, in one embodiment, the method comprises administering to the subject a therapeutically effective amount of the protein or polypeptide, or the pharmaceutical composition according to the invention, from about 0 hours to about 120 hours after the onset of brain inflammation and/or after a brain injury, preferably within 96 hours, more preferably within 72 hours.

In some embodiments, the method comprises administering to the subject a therapeutically effective amount of the protein or polypeptide, or the pharmaceutical composition according to the invention, within 48 hours after the onset of brain inflammation and/or after a brain injury, preferably within 24 hours, more preferably within 15 hours, even more preferably within 12 hours. In some embodiments, the method comprises administering to the subject a therapeutically effective amount of the protein or polypeptide, or the pharmaceutical composition according to the invention, within 10 hours, within 8 hours or within 6 hours after the onset of brain inflammation and/or after a brain injury. In some embodiments, the protein or polypeptide is administered within about 6 hours to about 8 hours after the onset of brain inflammation and/or after a brain injury.

In some embodiments, the method comprises administering to the subject a therapeutically effective amount of the protein or polypeptide, or the pharmaceutical composition according to the invention, within 120 hours after the onset of brain hemorrhage, preferably within 96 hours, more preferably within 72 hours. In other words, in one embodiment, the method comprises administering to the subject a therapeutically effective amount of the protein or polypeptide, or the pharmaceutical composition according to the invention, within about 0 hours to about 120 hours after the onset of brain hemorrhage, preferably within 96 hours, more preferably within 72 hours.

In some embodiments, the method comprises administering to the subject a therapeutically effective amount of the protein or polypeptide, or the pharmaceutical composition according to the invention, within 48 hours after the onset of brain hemorrhage, preferably within 24 hours, more preferably within 15 hours, even more preferably within 12 hours. In some embodiments, the method comprises administering to the subject a therapeutically effective amount of the protein or polypeptide, or the pharmaceutical composition according to the invention, within 10 hours, within 8 hours or within 6 hours after the onset of brain hemorrhage. In some embodiments, the protein or polypeptide is administered within about 6 hours to about 8 hours after the onset of brain hemorrhage.

In one embodiment, the method comprises administering to the subject a therapeutically effective amount of the protein or polypeptide, or the pharmaceutical composition according to the invention, from about 0 hours to about 120 hours after the onset of brain inflammation and/or after a brain injury, preferably from about 0 hours to about 96 hours, more preferably from about 0 hours to about 72 hours. In one embodiment, the method comprises administering to the subject a therapeutically effective amount of the protein or polypeptide, or the pharmaceutical composition according to the invention, from about 1 hour to about 120 hours after the onset of brain inflammation and/or after a brain injury, preferably from about 1 hour to about 96 hours, more preferably from about 1 hour to about 72 hours. In one embodiment, the method comprises administering to the subject a therapeutically effective amount of the protein or polypeptide, or the pharmaceutical composition according to the invention, from about 2 hours to about 120 hours after the onset of brain inflammation and/or after a brain injury, preferably from about 2 hours to about 96 hours, more preferably from about 2 hours to about 72 hours. In one embodiment, the method comprises administering to the subject a therapeutically effective amount of the protein or polypeptide, or the pharmaceutical composition according to the invention, from about 3 hours to about 120 hours after the onset of brain inflammation and/or after a brain injury, preferably from about 3 hours to about 96 hours, more preferably from about 3 hours to about 72 hours. In one embodiment, the method comprises administering to the subject a therapeutically effective amount of the protein or polypeptide, or the pharmaceutical composition according to the invention, from about 4 hours to about 120 hours after the onset of brain inflammation and/or after a brain injury, preferably from about 4 hours to about 96 hours, more preferably from about 4 hours to about 72 hours. In one embodiment, the method comprises administering to the subject a therapeutically effective amount of the protein or polypeptide, or the pharmaceutical composition according to the invention, from about 5 hours to about 120 hours after the onset of brain inflammation and/or after a brain injury, preferably from about 5 hours to about 96 hours, more preferably from about 5 hours to about 72 hours. In one embodiment, the method comprises administering to the subject a therapeutically effective amount of the protein or polypeptide, or the pharmaceutical composition according to the invention, from about 6 hours to about 120 hours after the onset of brain inflammation and/or after a brain injury, preferably from about 6 hours to about 96 hours, more preferably from about 6 hours to about 72 hours. In one embodiment, the method comprises administering to the subject a therapeutically effective amount of the protein or polypeptide, or the pharmaceutical composition according to the invention, from about 7 hours to about 120 hours after the onset of brain inflammation and/or after a brain injury, preferably from about 7 hours to about 96 hours, more preferably from about 7 hours to about 72 hours. In one embodiment, the method comprises administering to the subject a therapeutically effective amount of the protein or polypeptide, or the pharmaceutical composition according to the invention, from about 8 hours to about 120 hours after the onset of brain inflammation and/or after a brain injury, preferably from about 8 hours to about 96 hours, more preferably from about 8 hours to about 72 hours. In one embodiment, the method comprises administering to the subject a therapeutically effective amount of the protein or polypeptide, or the pharmaceutical composition according to the invention, from about 9 hours to about 120 hours after the onset of brain inflammation and/or after a brain injury, preferably from about 9 hours to about 96 hours, more preferably from about 9 hours to about 72 hours. In one embodiment, the method comprises administering to the subject a therapeutically effective amount of the protein or polypeptide, or the pharmaceutical composition according to the invention, from about 10 hours to about 120 hours after the onset of brain inflammation and/or after a brain injury, preferably from about 10 hours to about 96 hours, more preferably from about 10 hours to about 72 hours. In one embodiment, the method comprises administering to the subject a therapeutically effective amount of the protein or polypeptide, or the pharmaceutical composition according to the invention, from about 12 hours to about 120 hours after the onset of brain inflammation and/or after a brain injury, preferably from about 12 hours to about 96 hours, more preferably from about 12 hours to about 72 hours. In one embodiment, the method comprises administering to the subject a therapeutically effective amount of the protein or polypeptide, or the pharmaceutical composition according to the invention, from about 24 hours to about 120 hours after the onset of brain inflammation and/or after a brain injury, preferably from about 24 hours to about 96 hours, more preferably from about 24 hours to about 72 hours. In one embodiment, the method comprises administering to the subject a therapeutically effective amount of the protein or polypeptide, or the pharmaceutical composition according to the invention, from about 48 hours to about 120 hours after the onset of brain inflammation and/or after a brain injury, preferably from about 48 hours to about 96 hours, more preferably from about 48 hours to about 72 hours.

In one embodiment, the method comprises administering to the subject a therapeutically effective amount of the protein or polypeptide, or the pharmaceutical composition according to the invention, from about 0 hour to 120 hours after the onset of brain inflammation and/or after a brain injury, preferably from about 0 hour to 36, more preferably from about 0 hour to about 12 hours. In one embodiment, the method comprises administering to the subject a therapeutically effective amount of the protein or polypeptide, or the pharmaceutical composition according to the invention, from about 0 hour to about 36 hours, after the onset of brain inflammation and/or after a brain injury, preferably from about 0 hour to about 24 hours, more preferably from about 0 hour to about 12 hours.

In one embodiment, the method comprises administering to the subject a therapeutically effective amount of the protein or polypeptide, or the pharmaceutical composition according to the invention, from about 0 hour to about 24 hours after the onset of brain inflammation and/or after a brain injury, preferably from about 0 hour to about 20 hours, more preferably from about 0 hour to about 16 hours. In one embodiment, the method comprises administering to the subject a therapeutically effective amount of the protein or polypeptide, or the pharmaceutical composition according to the invention, from about 0 hour to about 15 hours after the onset of brain inflammation and/or after a brain injury, preferably from about 0 hour to about 14 hours, more preferably from about 0 hour to about 13 hours.

In a certain embodiment, the method comprises administering to the subject a therapeutically effective amount of the protein or polypeptide, or the pharmaceutical composition according to the invention, from about 0 hour to about 12 hours after the onset of brain inflammation and/or after a brain injury.

In one embodiment, the method comprises administering to the subject a therapeutically effective amount of the protein or polypeptide, or the pharmaceutical composition according to the invention, from about 0 hour to about 24 hours after the onset of brain inflammation and/or after a brain injury, preferably from about 4 hours to about 20 hours, more preferably from about 8 hours to about 16 hours. In one embodiment, the method comprises administering to the subject a therapeutically effective amount of the protein or polypeptide, or the pharmaceutical composition according to the invention, from about 10 hours to about 14 hours after the onset of brain inflammation and/or after a brain injury, preferably from about 10 hours to about 13 hours, more preferably from about 11 hour to about 13 hours. In a certain embodiment, the method comprises administering to the subject a therapeutically effective amount of the protein or polypeptide, or the pharmaceutical composition according to the invention, from about 11 hours to about 12 hours after the onset of brain inflammation and/or after a brain injury.

In one embodiment, the method comprises administering to the subject a therapeutically effective amount of the protein or polypeptide, or the pharmaceutical composition according to the invention, from about 2 hours to about 24 hours after the onset of brain inflammation and/or after a brain injury, preferably from about 4 hours to about 24 hours, more preferably from about 8 hours to about 24 hours. In a certain embodiment, the method comprises administering to the subject a therapeutically effective amount of the protein or polypeptide, or the pharmaceutical composition according to the invention, from about 10 hours to about 24 hours after the onset of brain inflammation and/or after a brain injury.

In one embodiment, the method comprises administering to the subject a therapeutically effective amount of the protein or polypeptide, or the pharmaceutical composition according to the invention, from about 10 to about 16 hours after the onset of brain inflammation and/or after a brain injury, preferably from about 11 hours to about 14 hours, more preferably from about 11 hours to about 13 hours.

In one embodiment, the method comprises administering to the subject a therapeutically effective amount of the protein or polypeptide, or the pharmaceutical composition according to the invention, about 12 hours after the onset of brain inflammation and/or after a brain injury.

In some embodiments, the method comprises administering to the subject a therapeutically effective amount of the protein or polypeptide, or the pharmaceutical composition according to the invention is at most 24 hours after the onset of brain inflammation and/or after a brain injury, preferably at most 15 hours and more preferably at most 12 hours.

In one embodiment, the method comprises administering to the subject a therapeutically effective amount of the protein or polypeptide, or the pharmaceutical composition according to the invention, within about 0 hours to about 120 hours after the onset of brain hemorrhage, preferably within about 0 hours to about 96 hours, more preferably within about 0 hours to about 72 hours. In one embodiment, the method comprises administering to the subject a therapeutically effective amount of the protein or polypeptide, or the pharmaceutical composition according to the invention, within about 1 hour to about 120 hours after the onset of brain hemorrhage, preferably within about 1 hour to about 96 hours, more preferably within about 1 hour to about 72 hours. In one embodiment, the method comprises administering to the subject a therapeutically effective amount of the protein or polypeptide, or the pharmaceutical composition according to the invention, within about 2 hours to about 120 hours after the onset of brain hemorrhage, preferably within about 2 hours to about 96 hours, more preferably within about 2 hours to about 72 hours. In one embodiment, the method comprises administering to the subject a therapeutically effective amount of the protein or polypeptide, or the pharmaceutical composition according to the invention, within about 3 hours to about 120 hours after the onset of brain hemorrhage, preferably within about 3 hours to about 96 hours, more preferably within about 3 hours to about 72 hours. In one embodiment, the method comprises administering to the subject a therapeutically effective amount of the protein or polypeptide, or the pharmaceutical composition according to the invention, within about 4 hours to about 120 hours after the onset of brain hemorrhage, preferably within about 4 hours to about 96 hours, more preferably within about 4 hours to about 72 hours. In one embodiment, the method comprises administering to the subject a therapeutically effective amount of the protein or polypeptide, or the pharmaceutical composition according to the invention, within about 5 hours to about 120 hours after the onset of brain hemorrhage, preferably within about 5 hours to about 96 hours, more preferably within about 5 hours to about 72 hours. In one embodiment, the method comprises administering to the subject a therapeutically effective amount of the protein or polypeptide, or the pharmaceutical composition according to the invention, within about 6 hours to about 120 hours after the onset of brain hemorrhage, preferably within about 6 hours to about 96 hours, more preferably within about 6 hours to about 72 hours. In one embodiment, the method comprises administering to the subject a therapeutically effective amount of the protein or polypeptide, or the pharmaceutical composition according to the invention, within about 7 hours to about 120 hours after the onset of brain hemorrhage, preferably within about 7 hours to about 96 hours, more preferably within about 7 hours to about 72 hours. In one embodiment, the method comprises administering to the subject a therapeutically effective amount of the protein or polypeptide, or the pharmaceutical composition according to the invention, within about 8 hours to about 120 hours after the onset of brain hemorrhage, preferably within about 8 hours to about 96 hours, more preferably within about 8 hours to about 72 hours. In one embodiment, the method comprises administering to the subject a therapeutically effective amount of the protein or polypeptide, or the pharmaceutical composition according to the invention, within about 9 hours to about 120 hours after the onset of brain hemorrhage, preferably within about 9 hours to about 96 hours, more preferably within about 9 hours to about 72 hours. In one embodiment, the method comprises administering to the subject a therapeutically effective amount of the protein or polypeptide, or the pharmaceutical composition according to the invention, within about 10 hours to about 120 hours after the onset of brain hemorrhage, preferably within about 10 hours to about 96 hours, more preferably within about 10 hours to about 72 hours. In one embodiment, the method comprises administering to the subject a therapeutically effective amount of the protein or polypeptide, or the pharmaceutical composition according to the invention, within about 12 hours to about 120 hours after the onset of brain hemorrhage, preferably within about 12 hours to about 96 hours, more preferably within about 12 hours to about 72 hours. In one embodiment, the method comprises administering to the subject a therapeutically effective amount of the protein or polypeptide, or the pharmaceutical composition according to the invention, within about 24 hours to about 120 hours after the onset of brain hemorrhage, preferably within about 24 hours to about 96 hours, more preferably within about 24 hours to about 72 hours. In one embodiment, the method comprises administering to the subject a therapeutically effective amount of the protein or polypeptide, or the pharmaceutical composition according to the invention, within about 48 hours to about 120 hours after the onset of brain hemorrhage, preferably within about 48 hours to about 96 hours, more preferably within about 48 hours to about 72 hours.

In one embodiment, the method comprises administering to the subject a therapeutically effective amount of the protein or polypeptide, or the pharmaceutical composition according to the invention, within about 0 hour to 120 hours after the onset of brain hemorrhage, preferably within about 0 hour to 36, more preferably within about 0 hour to about 12 hours. In one embodiment, the method comprises administering to the subject a therapeutically effective amount of the protein or polypeptide, or the pharmaceutical composition according to the invention, within about 0 hour to about 36 hours, after the onset of brain hemorrhage, preferably within about 0 hour to about 24 hours, more preferably within about 0 hour to about 12 hours.

In one embodiment, the method comprises administering to the subject a therapeutically effective amount of the protein or polypeptide, or the pharmaceutical composition according to the invention, within about 0 hour to about 24 hours after the onset of brain hemorrhage, preferably within about 0 hour to about 20 hours, more preferably within about 0 hour to about 16 hours. In one embodiment, the method comprises administering to the subject a therapeutically effective amount of the protein or polypeptide, or the pharmaceutical composition according to the invention, within about 0 hour to about 15 hours after the onset of brain hemorrhage, preferably within about 0 hour to about 14 hours, more preferably from about 0 hour to about 13 hours.

In a certain embodiment, the method comprises administering to the subject a therapeutically effective amount of the protein or polypeptide, or the pharmaceutical composition according to the invention, within about 0 hour to about 12 hours after the onset of brain hemorrhage.

In one embodiment, the method comprises administering to the subject a therapeutically effective amount of the protein or polypeptide, or the pharmaceutical composition according to the invention, within about 0 hour to about 24 hours after the onset of brain hemorrhage, preferably within about 4 hours to about 20 hours, more preferably within about 8 hours to about 16 hours. In one embodiment, the method comprises administering to the subject a therapeutically effective amount of the protein or polypeptide, or the pharmaceutical composition according to the invention, within about 10 hours to about 14 hours after the onset of brain hemorrhage, preferably within about 10 hours to about 13 hours, more preferably within about 11 hours to about 13 hours. In a certain embodiment, the method comprises administering to the subject a therapeutically effective amount of the protein or polypeptide, or the pharmaceutical composition according to the invention, within about 11 hours to about 12 hours after brain hemorrhage.

In one embodiment, the method comprises administering to the subject a therapeutically effective amount of the protein or polypeptide, or the pharmaceutical composition according to the invention, within about 2 hours to about 24 hours after the onset of brain hemorrhage, preferably within about 4 hours to about 24 hours, more preferably within about 8 hours to about 24 hours. In a certain embodiment, the method comprises administering to the subject a therapeutically effective amount of the protein or polypeptide, or the pharmaceutical composition according to the invention, within about 10 hours to about 24 hours after the onset of brain hemorrhage.

In one embodiment, the method comprises administering to the subject a therapeutically effective amount of the protein or polypeptide, or the pharmaceutical composition according to the invention, within about 10 to about 16 hours after the onset of brain hemorrhage, preferably within about 11 hours to about 14 hours, more preferably within about 11 hours to about 13 hours.

In one embodiment, the method comprises administering to the subject a therapeutically effective amount of the protein or polypeptide, or the pharmaceutical composition according to the invention, within about 12 hours after the onset of brain hemorrhage.

In some embodiments, the method comprises administering to the subject a therapeutically effective amount of the protein or polypeptide, or the pharmaceutical composition according to the invention is preferably after 12 hours after the onset of brain hemorrhage, preferably at most 15 hours and more preferably at most 12 hours.

In some embodiments, the method is not for preventing and/or treating a thrombus. In some embodiments, the brain inflammation is not associated with the presence or the formation of a thrombus.

In some embodiments, the method comprises the steps of:
administering the subject with an initial dose comprising a therapeutically effective amount of the protein or polypeptide, nucleic acid, vector, composition, pharmaceutical composition or medicament according to the invention, and
administering the subject with a perfusion comprising a therapeutically effective amount of the protein or polypeptide, nucleic acid, vector, composition, pharmaceutical composition or medicament according to the invention, wherein the initial dose is higher or equal to the perfusion dose.

The present invention further relates to a method for preventing and/or treating brain inflammation without increasing hemorrhagic and/or lesion (edema) volumes. The present invention further relates to a method for preventing and/or treating cerebral injury after cerebral hemorrhage, preferably after hemorrhagic stroke.

The present invention further relates to a method for preventing and/or treating a disease, condition or symptom associated with brain inflammation, comprising administering to the subject a therapeutically effective amount of the protein or polypeptide, nucleic acid, vector, composition, pharmaceutical composition or medicament according to the invention. In some embodiments, the method is for preventing and/or treating a disease, condition or symptom induced by brain inflammation, comprising administering to the subject a therapeutically effective amount of the protein or polypeptide, nucleic acid, vector, composition, pharmaceutical composition or medicament according to the invention. In some embodiments, the disease, condition or symptom is selected from the group comprising or consisting of neuronal cell death, excitotoxicity, microglia activation and oxidative stress.

In some embodiments, the method of the invention is used to alleviate the symptoms of a subject suffering from a traumatic or a non-traumatic brain injury.

The present invention further relates to a method for decreasing inflammation in a subject, comprising administering to the subject a therapeutically effective amount of the protein or polypeptide, nucleic acid, vector, composition, pharmaceutical composition or medicament according to the invention.

Another object of the present invention is a method for preventing, reducing, decreasing and/or inhibiting neuronal death in a subject in need thereof, comprising administering to the subject a therapeutically effective amount of the protein or polypeptide, nucleic acid, vector, composition, pharmaceutical composition or medicament according to the invention.

In one embodiment, the subject in need thereof is a subject having or susceptible to have a brain inflammation. In one embodiment, the method is for preventing, reducing, decreasing and/or inhibiting neuronal death occurring or susceptible to occur after brain inflammation in a subject in need thereof.

In one embodiment, the subject in need thereof is a subject having or susceptible to have a brain hemorrhage. In one embodiment, the method is for preventing, reducing, decreasing and/or inhibiting neuronal death occurring or susceptible to occur after brain hemorrhage in a subject in need thereof.

In some embodiments, the method comprises administering to the subject a therapeutically effective amount of the protein or polypeptide, or the pharmaceutical composition according to the invention, within 120 hours after the onset of neuronal death and/or brain hemorrhage, preferably within 96 hours, more preferably within 72 hours. In some embodiments, the method comprises administering to the subject a therapeutically effective amount of the protein or polypeptide, or the pharmaceutical composition according to the invention, within 48 hours after the onset of neuronal death and/or brain hemorrhage, preferably within 24 hours, more preferably within 15 hours, even more preferably within 12 hours. In some embodiments, the method comprises administering to the subject a therapeutically effective amount of the protein or polypeptide, or the pharmaceutical composition according to the invention, within 10 hours, within 8 hours or within 6 hours after the onset of neuronal death and/or brain hemorrhage. In some embodiments, the protein or polypeptide is administered within about 6 hours to about 8 hours after the onset of neuronal death and/or brain hemorrhage.

In one embodiment, the method comprises administering to the subject a therapeutically effective amount of the protein or polypeptide, or the pharmaceutical composition according to the invention, within about 0 hours to about 120 hours after the onset of neuronal death and/or brain hemorrhage, preferably within about 0 hours to about 96 hours, more preferably within about 0 hours to about 72 hours. In one embodiment, the method comprises administering to the subject a therapeutically effective amount of the protein or polypeptide, or the pharmaceutical composition according to the invention, within about 1 hour to about 120 hours after the onset of neuronal death and/or brain hemorrhage, preferably within about 1 hour to about 96 hours, more preferably within about 1 hour to about 72 hours. In one embodiment, the method comprises administering to the subject a therapeutically effective amount of the protein or polypeptide, or the pharmaceutical composition according to the invention, within about 2 hours to about 120 hours after the onset of neuronal death and/or brain hemorrhage, preferably within about 2 hours to about 96 hours, more preferably within about 2 hours to about 72 hours. In one embodiment, the method comprises administering to the subject a therapeutically effective amount of the protein or polypeptide, or the pharmaceutical composition according to the invention, within about 3 hours to about 120 hours after the onset of neuronal death and/or brain hemorrhage, preferably within about 3 hours to about 96 hours, more preferably within about 3 hours to about 72 hours. In one embodiment, the method comprises administering to the subject a therapeutically effective amount of the protein or polypeptide, or the pharmaceutical composition according to the invention, within about 4 hours to about 120 hours after the onset of neuronal death and/or brain hemorrhage, preferably within about 4 hours to about 96 hours, more preferably within about 4 hours to about 72 hours. In one embodiment, the method comprises administering to the subject a therapeutically effective amount of the protein or polypeptide, or the pharmaceutical composition according to the invention, within about 5 hours to about 120 hours after the onset of neuronal death and/or brain hemorrhage, preferably within about 5 hours to about 96 hours, more preferably within about 5 hours to about 72 hours. In one embodiment, the method comprises administering to the subject a therapeutically effective amount of the protein or polypeptide, or the pharmaceutical composition according to the invention, within about 6 hours to about 120 hours after the onset of neuronal death and/or brain hemorrhage, preferably within about 6 hours to about 96 hours, more preferably within about 6 hours to about 72 hours. In one embodiment, the method comprises administering to the subject a therapeutically effective amount of the protein or polypeptide, or the pharmaceutical composition according to the invention, within about 7 hours to about 120 hours after the onset of neuronal death and/or brain hemorrhage, preferably within about 7 hours to about 96 hours, more preferably within about 7 hours to about 72 hours. In one embodiment, the method comprises administering to the subject a therapeutically effective amount of the protein or polypeptide, or the pharmaceutical composition according to the invention, within about 8 hours to about 120 hours after the onset of neuronal death and/or brain hemorrhage, preferably within about 8 hours to about 96 hours, more preferably within about 8 hours to about 72 hours. In one embodiment, the method comprises administering to the subject a therapeutically effective amount of the protein or polypeptide, or the pharmaceutical composition according to the invention, within about 9 hours to about 120 hours after the onset of neuronal death and/or brain hemorrhage, preferably within about 9 hours to about 96 hours, more preferably within about 9 hours to about 72 hours. In one embodiment, the method comprises administering to the subject a therapeutically effective amount of the protein or polypeptide, or the pharmaceutical composition according to the invention, within about 10 hours to about 120 hours after the onset of neuronal death and/or brain hemorrhage, preferably within about 10 hours to about 96 hours, more preferably within about 10 hours to about 72 hours. In one embodiment, the method comprises administering to the subject a therapeutically effective amount of the protein or polypeptide, or the pharmaceutical composition according to the invention, within about 12 hours to about 120 hours after the onset of neuronal death and/or brain hemorrhage, preferably within about 12 hours to about 96 hours, more preferably within about 12 hours to about 72 hours.

In a certain embodiment, the method comprises administering to the subject a therapeutically effective amount of the protein or polypeptide, or the pharmaceutical composition according to the invention, within about 0 hour to about 12 hours after the onset of neuronal death and/or brain hemorrhage.

In one embodiment, the method comprises administering to the subject a therapeutically effective amount of the protein or polypeptide, or the pharmaceutical composition according to the invention, within about 0 hour to about 24 hours after the onset of neuronal death and/or brain hemorrhage, preferably within about 4 hours to about 20 hours, more preferably within about 8 hours to about 16 hours. In one embodiment, the method comprises administering to the subject a therapeutically effective amount of the protein or polypeptide, or the pharmaceutical composition according to the invention, within about 10 hours to about 14 hours after the onset of neuronal death and/or brain hemorrhage, preferably within about 10 hours to about 13 hours, more preferably within about 11 hours to about 13 hours. In a certain embodiment, the method comprises administering to the subject a therapeutically effective amount of the protein or polypeptide, or the pharmaceutical composition according to the invention, within about 11 hours to about 12 hours after neuronal death and/or brain hemorrhage.

In one embodiment, the method comprises administering to the subject a therapeutically effective amount of the protein or polypeptide, or the pharmaceutical composition according to the invention, within about 2 hours to about 24 hours after the onset of neuronal death and/or brain hemorrhage, preferably within about 4 hours to about 24 hours, more preferably within about 8 hours to about 24 hours. In a certain embodiment, the method comprises administering to the subject a therapeutically effective amount of the protein or polypeptide, or the pharmaceutical composition according to the invention, within about 10 hours to about 24 hours after the onset of neuronal death and/or brain hemorrhage.

In one embodiment, the method comprises administering to the subject a therapeutically effective amount of the protein or polypeptide, or the pharmaceutical composition according to the invention, within about 10 to about 16 hours after the onset of neuronal death and/or brain hemorrhage, preferably within about 11 hours to about 14 hours, more preferably within about 11 hours to about 13 hours.

In one embodiment, the method comprises administering to the subject a therapeutically effective amount of the protein or polypeptide, or the pharmaceutical composition according to the invention, within about 15 hours after the onset of neuronal death and/or brain hemorrhage, preferably within 12 hours.

Still another object of the present invention is a method for preventing and/or treating a disease related to, associated to or due to neuronal death in a subject in need thereof, comprising administering to the subject a therapeutically effective amount of the protein or polypeptide, nucleic acid, vector, composition, pharmaceutical composition or medicament according to the invention.

The present invention further relates to a protein or polypeptide, nucleic acid, vector, composition, pharmaceutical composition or medicament according to the invention for use for preventing and/or treating a disease related to, associated to or due to neuronal death in a subject in need thereof.

In one embodiment, the disease related to, associated to or due to neuronal death is selected from the group comprising or consisting of Alzheimer's disease, Parkinson's disease, Huntington's disease, ischemic stroke, hemorrhagic stroke, prion disease (Creutzfeldt-Jakob disease), amyotrophic lateral sclerosis, motor neuron disease, spinal muscular atrophy, spinocerebellar ataxia, traumatic brain injury, multiple sclerosis, frontotemporal dementia, epilepsy, brain tumors, cryptogenic stroke, brain stem stroke, transient ischemic attack, Batten disease, Friedreich's ataxia, Alexander disease, chronic traumatic encephalopathy, cerebellar stroke, acute hepatic encephalopathy, acute carbon monoxide poisoning, encephalitis, meningitis, acute necrotizing encephalopathy and acute disseminated encephalomyelitis.

In one embodiment, the disease related to, associated to or due to neuronal death is selected from the group comprising or consisting of ischemic stroke, hemorrhagic stroke, prion disease (Creutzfeldt-Jakob disease), amyotrophic lateral sclerosis, motor neuron disease, spinal muscular atrophy, spinocerebellar ataxia, traumatic brain injury, multiple sclerosis, frontotemporal dementia, cryptogenic stroke, brain stem stroke, transient ischemic attack, Batten disease, Friedreich's ataxia, Alexander disease, chronic traumatic encephalopathy, cerebellar stroke, acute hepatic encephalopathy, acute carbon monoxide poisoning, encephalitis, meningitis, acute necrotizing encephalopathy and acute disseminated encephalomyelitis.

In one embodiment, the disease related to, associated to or due to neuronal death is selected from the group comprising or consisting of prion disease (Creutzfeldt-Jakob disease), amyotrophic lateral sclerosis, motor neuron disease, spinal muscular atrophy, spinocerebellar ataxia, traumatic brain injury, multiple sclerosis, frontotemporal dementia, Batten disease, Friedreich's ataxia, Alexander disease, chronic traumatic encephalopathy, cerebellar stroke, acute hepatic encephalopathy, acute carbon monoxide poisoning, encephalitis, meningitis, acute necrotizing encephalopathy and acute disseminated encephalomyelitis.

In one embodiment, the disease related to, associated to or due to neuronal death is selected from the group comprising or consisting of prion disease (Creutzfeldt-Jakob disease), amyotrophic lateral sclerosis, motor neuron disease, spinal muscular atrophy, spinocerebellar ataxia, traumatic brain injury, multiple sclerosis, frontotemporal dementia, Batten disease, Friedreich's ataxia, Alexander disease, chronic traumatic encephalopathy, acute hepatic encephalopathy, acute carbon monoxide poisoning, encephalitis, meningitis, acute necrotizing encephalopathy and acute disseminated encephalomyelitis.

EXAMPLES

The present invention is further illustrated by the following examples.

Example 1: Hemorrhagic Risk Assessment of Ir-CPI in the Murine Intracerebral Hemorrhage Model Materials and Methods Murine Intracerebral Hemorrhage Model Intracerebral hemorrhage (ICH) has been induced in adult Swiss male mice by an injection of a standardized amount of bacterial collagenase into the right striatum. Injection of collagenase leads to disruption of the extracellular matrix in the basal lamina.

After anesthesia and jugular catheter positioning, mice were positioned in a sphinx position in a stereotaxic frame. Under aseptic conditions, the skin was incised on about one-centimeter length on the top of the skull. The skull was cleared to localize Bregma. The injection coordinates (right striatum: Bregma +0.5 mm; Mediolateral −2.5 mm; Dorsoventral −3 mm) were then calculated from Bregma based on a brain Atlas. The skull was drilled and, with a micromanipulator, a glass needle tip was inserted in the right striatum. A standardized amount (0.04 IU in 0.5 μL of sterile NaCl 0.9%) of bacterial collagenase (collagenase from Clostridium histolyticum, ref. C2399, Sigma-Aldrich®) was slowly injected. Then the needle was slowly removed and the skull skin was sutured.

Treatment Administration

Treatment (either PBS, Ir-CPI or enoxaparin) bolus has been administered immediately after stroke induction. Then, continuous perfusion (PBS or Ir-CPI) has been performed for 72 h using ALZET® osmotic pump ensuring constant plasmatic level of the drug. Animals receiving a bolus of enoxaparin (Lovenox®; Sanofi Aventis) (20 mg/kg) after ICH induction received a continuous perfusion of saline solution (NaCl 0.9%) for 72 h. Ir-CPI (Batch DP B3012503) has been injected as an IV bolus at 30.7 mg/kg followed by an IV continuous perfusion for 72 h at 8.3 mg/kg/h. Vehicle-injected mice received an IV bolus of PBS followed by a continuous perfusion of PBS during 72 h.

Magnetic Resonance Imaging

Intracerebral bleeding and lesion volumes were evaluated using magnetic resonance imaging (MRI) 24 h and 3 days (D3) after stroke onset. The MRI device was a 7T-Pharmascan MRI system (Bruker BioSpin MRI GmbH, Ettlinger, Germany) equipped with volume transmit and surface receive coils and piloted by Paravision@ V6.

Images were analyzed using ImageJ v1.52 (NIH, Bethesda, USA). Research assistants in charge of image analyses were blinded to the group assignment. T2* images were analyzed to measure cerebral hemorrhages. For each mouse on each session, hemorrhage area—that appears as an hypointensity area on the image—was measured on the slices. For each animal, hemorrhage volume was calculated as followed: sum of measured areas×slice thickness. Hemorrhage volume was expressed in $mm^3$.

T2W images were analyzed to determine lesion volumes. For each mouse on each session, the lesioned area—that appears as an hyperintensity area on image—was measured on the slices. For each animal, hemorrhage volume was estimated as follow: sum of measured areas×slice thickness. Hemorrhage volume was expressed in $mm^3$.

Results

Ir-CPI treatment did not increase lesion (edema) nor hemorrhage volumes in the striatum at Day 1 and at Day 3 compared to the control group (PBS), as opposed to a treatment with enoxaparin (Low Molecular Weight Heparin, LMWH) (FIG. 1A-1D). Therefore, Ir-CPI perfused for 72 h is safe, contrary to enoxaparin.

Example 2: Anti-Inflammatory Effect of Ir-CPI in a Murine Model of Intracerebral Hemorrhage Materials and Methods Immunostaining Immunostaining was performed on brain slices to assess neutrophil infiltration and their expression of NETs. Brain slices were obtained from mice previously used to measure effect of treatments on lesion and hemorrhage volumes (see Example 1). MPO is a marker expressed by activated neutrophils, NETs, microglia and monocytes/macrophages. Ly6G is a specific marker of neutrophils. Concomitant staining of Ly6G (Anti-Mouse Ly-6G Antibody, Clone 1A8, Rat monoclonal IgG2a—Cat. #60031 STEMCELL™), H3Cit (Anti-Histone H3 (citrulline R2+R8+R17) antibody—Cat. #ab5103 ABCAM), MPO (Anti-Myeloperoxidase antibody—Cat. #AF3667 BIO-TECHNE®) and DNA (DAPI) was performed in order to evaluate to identify neutrophils releasing extracellular traps (NETs). Research assistants in charge of analyses were blinded to the group assignment.

Results

Figure 2A:
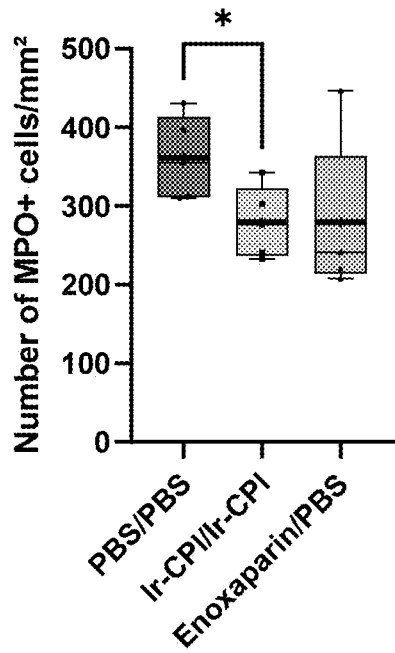
FIGS. 2A-2C are a set of box plots showing the quantification of mean labelled cells in the hemorrhagic zone (anterior position/injection site/posterior position) on Day 3 after intracerebral hemorrhage induction. Mice were treated with either Ir-CPI (injection+perfusion), enoxaparin (injection enoxaparin+perfusion with NaCl) or PBS alone (injection+perfusion). 2A shows the number of cells positive for MPO immunostaining. 2B shows the number of cells positive for Ly6G immunostaining (neutrophils). 2C shows the number of cells positive for Ly6G, H3Cit and MPO co-immunostaining (neutrophils releasing NETs). Boxes show median and quartiles. Whiskers show min and max. Individual values are plotted. Bold lines indicate the means. N=5 mice per group. *p<0.05 (Unpaired T test).
Figure 2B:
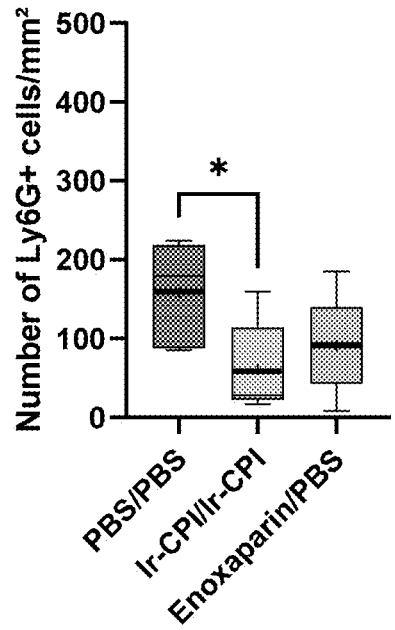
Figure 2C:
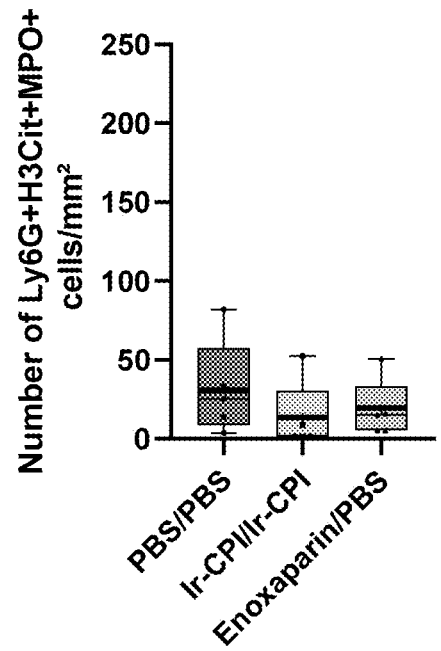

In the whole hemorrhagic zone (mean of anterior zone—injection site—posterior zone), a significant reduction of cells expressing MPO—a marker of activated neutrophils, NETs, microglia, monocytes/macrophages—was observed in Ir-CPI-treated mice as opposed to mice administered with PBS (FIG. 2A). Moreover, Ir-CPI significantly reduced neutrophil infiltration (Ly6G+ cells) when compared to mice administered with PBS (FIG. 2B). Still, when assessing the whole hemorrhagic zone, a trend to a decrease in the number of neutrophils releasing NETs (Ly6G+H3Cit+MPO+cells) was observed in the Ir-CPI and enoxaparin groups (FIG. 2C).

Figure 3:
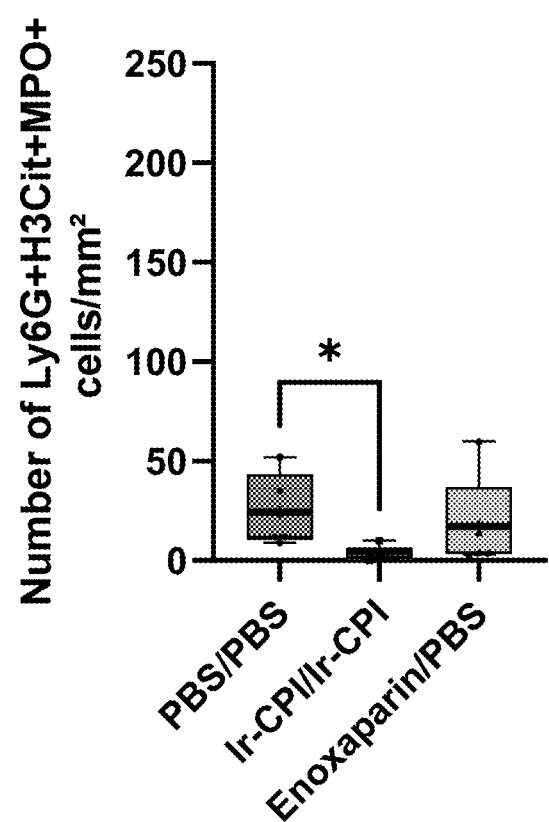
FIG. 3 is a box plot showing the quantification of neutrophils releasing NETs at the site of collagenase injection on Day 3 after intracerebral hemorrhage induction (number of cells positive for Ly6G, H3Cit and MPO co-immunostaining). Mice were treated with either Ir-CPI (injection+perfusion), enoxaparin (injection enoxaparin+perfusion with NaCl) or PBS alone (injection+perfusion). Boxes show median and quartiles. Whiskers show min and max. Individual values are plotted. Bold lines indicate the means. N=5 mice per group. *p<0.05 (Unpaired T test).

Moreover, when assessing the injection site only, a significant reduction of neutrophils releasing NETs (Ly6G+ H3Cit+MPO+cells) was observed in Ir-CPI-treated mice when compared to mice administered with PBS (FIG. 3). Enoxaparin had no statistically significant impact on these cells.

Example 3: Effect of Ir-CPI on Neuronal Death

Materials and Methods

Fluoro-Jade® C staining (TR-100-FJ, Tebu-Bio) was performed on the brain slices to evaluate and localize degenerating neurons. The brains were sectioned in coronal slices with a cryostat (10 µm slices). Three (3) slices per animal were used for staining, the 3 slices corresponding to the collagenase injection site, 600 µm anterior and 600 µm posterior to the injection site.

The slides with the frozen tissue sections were first immersed in a basic alcohol solution of 1% sodium hydroxide in 80% ethanol for 5 minutes. They were then rinsed for 2 minutes in 70% ethanol, for 2 minutes in distilled water, and then incubated in a solution of potassium permanganate 0.06% for 10 minutes. After rinsing with water for 2 minutes, the slides were transferred for 10 minutes to a solution of Fluoro-Jade® C (TR-100-FJ, Tebu-Bio) in the dark. The appropriate dilution was performed by preparing a 0.01% stock solution of the dye in distilled water. The working solution is stored up to 4 h at 4-8° C.

To label nuclear DNA, 4',6-diamidino-2-phenylindole (DAPI; 0.01% of Staining Solution D) was added to Fluoro-Jade® Staining Solution C. The slides were then rinsed with three changes of distilled water for 1 minute per change. Excess water was drained onto a paper towel, and the slides were then air-dried on a 50° C.-blade heater for at least 5 minutes in the dark. The air-dried slides were then bleached with xylene for at least 1 minute, and then coated with a nonfluorescent mounting medium Fluoromount-G™ (00-4958-02; Invitrogen™).

Using an epifluorescence microscope (Leica DM6 B), Fluoro-Jade® C was visualized using blue light or a 488 nm laser (excitation peak: 495 nm; emission peak: 521 nm) and the blue nuclear labeling conferred by DAPI was visualized via ultraviolet light excitation (emission peak: 340 nm; excitation peak: 488 nm). Images were acquired and 4 areas per slice were analyzed using Image J software (version 1.52a) to qualitatively assess neuronal death. The analyses were performed in a blinded fashion, with respect to group assignment, by the research assistants.

Results

Neuronal degeneration was assessed in the brains of mice treated with PBS, Ir-CPI or enoxaparin, using Fluoro-Jade® C staining.

Figure 4A:
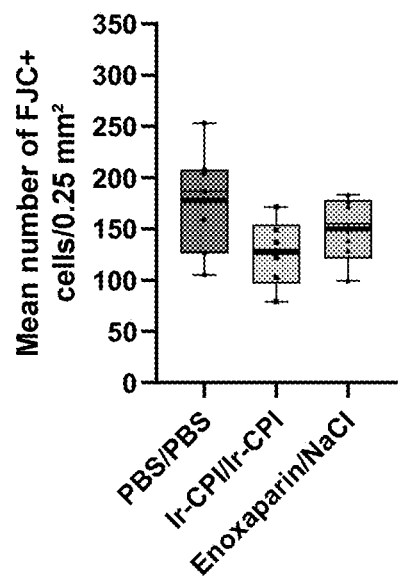
FIGS. 4A-4B are a set of box plots showing that Ir-CPI decreases neuronal death in the brain of mice with intracerebral hemorrhage, at the hemorrhagic zone (average of the anterior zone, the injection site, and posterior area) (4A) and at the injection site (4B). Boxes indicate median and quartiles. Bold lines indicate means. Whiskers indicate minimum and maximum values. Individual data are shown [at Day 3, n=7 mice (PBS/PBS), n=6 mice (Ir-CPI/Ir-CPI or Enoxaparin/NaCl)]. The p values were calculated using a Kruskal-Wallis test with Dunn's multiple comparisons test. *p<0.05.

In the hemorrhagic area (average of anterior, injection site, and posterior area), Ir-CPI decreased the average number of degenerating neurons compared with PBS-treated mice (FIG. 4A). At the injection site (FIG. 4B), Ir-CPI significantly decreased the number of degenerating neurons compared to control mice that received PBS ($p<0.05$).

Figure 4B:
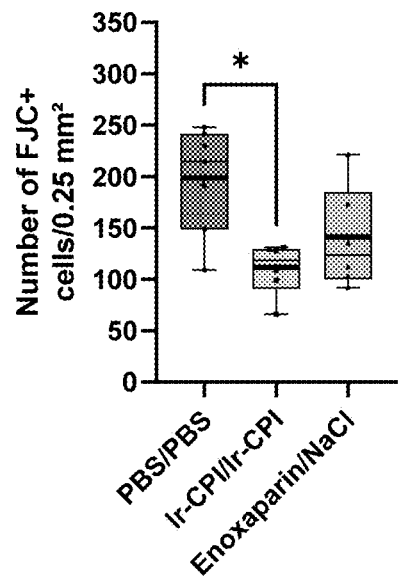

Conversely, enoxaparin treatment had no significant effect on neuronal death ($p>0.05$) (FIGS. 4A and 4B).

The invention claimed is:

1. A method for treating brain inflammation occurring after an onset of a brain hemorrhage in a subject, comprising administering to said subject after the onset of the brain hemorrhage, a therapeutically effective amount of a protein or polypeptide comprising a polypeptide having at least 90% sequence identity with the amino acid sequence SEQ ID NO: 1, or a pharmaceutical composition comprising thereof, wherein said protein or polypeptide is administered within 120 hours after the onset of brain hemorrhage in said subject, wherein said brain inflammation occurs after the onset of the brain hemorrhage, and wherein said brain inflammation is not induced by the presence or the formation of a thrombus.

2. The method according to claim 1, wherein said protein or polypeptide is administered within 72 hours after the onset of brain hemorrhage.

3. The method according to claim 1, wherein said protein or polypeptide is administered within 48 hours after the onset of brain hemorrhage.

4. The method according to claim 1, wherein said protein or polypeptide is administered within 24 hours after the onset of brain hemorrhage.

5. The method according to claim 1, wherein said protein or polypeptide is administered within 12 hours after the onset of brain hemorrhage.

6. The method according to claim 1, wherein said protein or polypeptide comprises a polypeptide having the amino acid sequence SEQ ID NO: 1 or SEQ ID NO: 2.

7. The method according to claim 1, wherein said protein or polypeptide comprises a polypeptide having the amino acid sequence SEQ ID NO: 2.

8. The method according to claim 1, wherein said hemorrhage is an intracerebral hemorrhage.

9. The method according to claim 1, wherein said therapeutically effective amount is a dose of about 200 mg to about 20,000 mg per adult per day.

10. The method according to claim 1, wherein said protein or polypeptide is administered continuously.

11. The method according to claim 10, wherein said protein or polypeptide is administered by perfusion for about 24 hours to about 72 hours.

12. The method according to claim 1, wherein the pharmaceutical composition further comprises another therapeutic agent.

13. A method for treating brain inflammation occurring after an onset of a brain injury in a subject, comprising administering to said subject after the onset of the brain injury a therapeutically effective amount of a protein or polypeptide comprising a polypeptide having at least 90% sequence identity with the amino acid sequence SEQ ID NO: 1, or a pharmaceutical composition comprising thereof, wherein said protein or polypeptide is administered within about 120 hours after the onset of brain injury, wherein said brain inflammation occurs after the onset of the brain injury, and wherein said brain inflammation is not induced by the presence or the formation of a thrombus.

14. The method according to claim 13, wherein said protein or polypeptide is administered within about 15 hours after the onset of brain injury.

15. The method according to claim 13, wherein said protein or polypeptide is administered continuously.

16. The method according to claim 15, wherein said protein or polypeptide is administered by perfusion for about 24 hours to about 72 hours.

* * * * *